United States Patent
Nayar et al.

(10) Patent No.: US 6,229,913 B1
(45) Date of Patent: May 8, 2001

(54) APPARATUS AND METHODS FOR DETERMINING THE THREE-DIMENSIONAL SHAPE OF AN OBJECT USING ACTIVE ILLUMINATION AND RELATIVE BLURRING IN TWO-IMAGES DUE TO DEFOCUS

(75) Inventors: Shree Nayar, New York, NY (US); Minori Noguchi; Masahiro Wantanabe, both of Yokohama (JP)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 08/776,799

(22) PCT Filed: Jun. 7, 1995

(86) PCT No.: PCT/US95/07890

§ 371 Date: Jul. 18, 1997

§ 102(e) Date: Jul. 18, 1997

(87) PCT Pub. No.: WO96/41304

PCT Pub. Date: Dec. 19, 1996

(51) Int. Cl.⁷ ...................................................... G06K 9/00
(52) U.S. Cl. ...................... 382/154; 382/285; 250/201.4
(58) Field of Search ................................... 382/154, 212, 382/279, 285; 250/201.4, 201.6; 355/55

(56) References Cited

U.S. PATENT DOCUMENTS

| | | | |
|---|---|---|---|
| 4,640,620 | 2/1987 | Schmidt | 356/376 |
| 4,875,777 | 10/1989 | Harding | 356/376 |
| 4,965,442 | 10/1990 | Girod | 250/201.7 |
| 4,965,854 | 10/1990 | Subbarao | 352/106 |
| 4,983,043 | 1/1991 | Harding | 356/376 |
| 5,003,166 | * 3/1991 | Girod | 250/201.4 |
| 5,078,496 | 1/1992 | Parker | 356/371 |
| 5,231,443 | 7/1993 | Subbarao | 354/400 |
| 5,793,473 | * 8/1998 | Koyama | 355/55 |

OTHER PUBLICATIONS

A. Pentland et al., "Simple Range Cameras Based on Focal Error," J. Optical Soc'y of America, vol. 11, pp. 2925–34 (1994).

(List continued on next page.)

*Primary Examiner*—Matthew C. Bella
(74) *Attorney, Agent, or Firm*—Baker Botts L.L.P.

(57) ABSTRACT

A method and apparatus for mapping depth of an object (22) in a preferred arrangement uses a projected light pattern to provide a selected texture to the object (22) along the optical axis (24) of observation. An imaging system senses (32, 34) first and second images of the object (22) with the projected light pattern and compares the defocused of the projected pattern in the images to determine relative depth of elemental portions of the object (22).

51 Claims, 16 Drawing Sheets

OTHER PUBLICATIONS

K.G. Harding et al., "Hybrid, High Accuracy Structured Light Profiler," Proceedings of the SPIE—The Int'l Soc'y for Optical Eng'g, vol. 728, pp. 132–45 (1986 ;

T. Hwang et al., "A Depth Algorith, Using Defocus Information," Computer Vision and Pattern Recognition, p 476 (IEEE 1989).

M. Subbarao et al., "Depth Recovery From Blurred Edges," Computer Vision and Pattern Recognition, p 498 (IEEE 1988).

S. Lai et al., "A Generalized Depth Estimation Algorithm With A Single Image," 14 IEEE Trans. Pattern Analysis & Machine Intelligence, p. 405 (1992).

J. Ens et al., "An Investigation of Methods For Determining Depth From Focus," 15 IEEE Trans. Pattern Analysis & Machine Intelligence p. 405 (1993).

M. Subbarao et al., "Focused Image Recovery From Two Defocused Images . . . ," Computer Vision and Pattern Recognition, p 786 (IEEE 1994).

Y. Xiong et al., "Depth From Focusing and Defocusing," Computer Vision and Pattern Recognition, p 68 (IEEE 1993).

G. Schneider et al., "Monocular Depth Perception By Evaluation of the Blur in Defocused Images," Image Processing p. 116 (IEEE 1994).

B. Girod et al., "Depth From Defocus of Structured Light," Proceedings of the SPIE—The Int'l Soc'y for Optical Eng'g, vol. 1194, pp. 209–215 (1990).

A.J. Makynen et al., "A High–Resolution Lateral Displacement Sensing Method Using Active Illumination of a Cooperative Target and a Focused Four–Quadrant Position–Sensing Detector," IEEE Transactions of Inst. and Measurement, vol. 44, pp. 46–52 (1995).

* cited by examiner

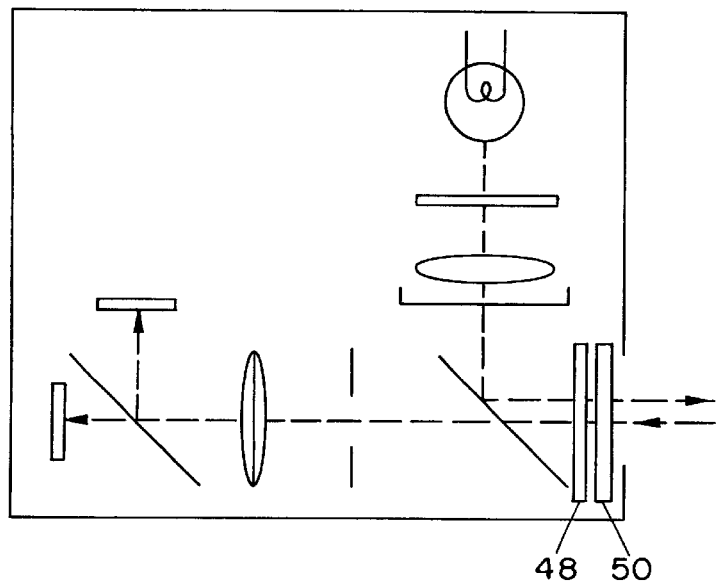
FIG. 10 D
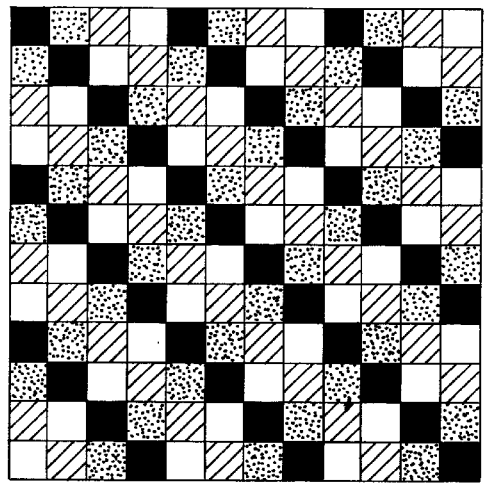 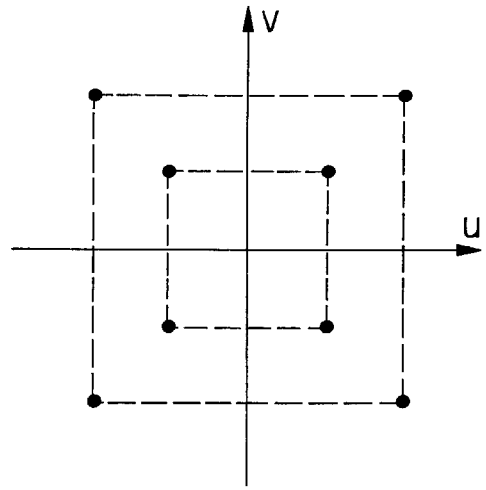
FIG. 11A          FIG. 11B

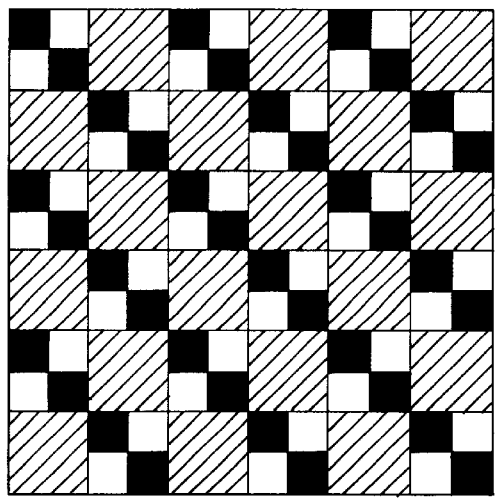
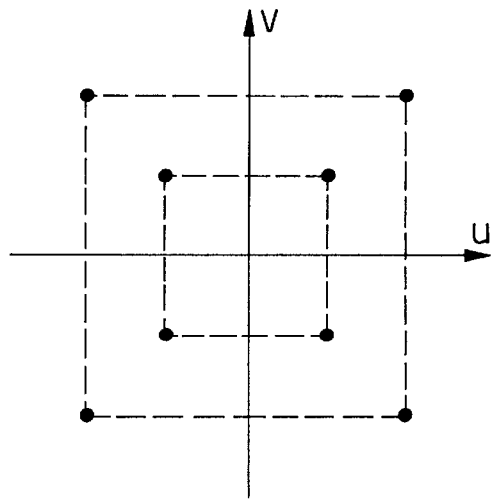
FIG. 12A             FIG. 12B
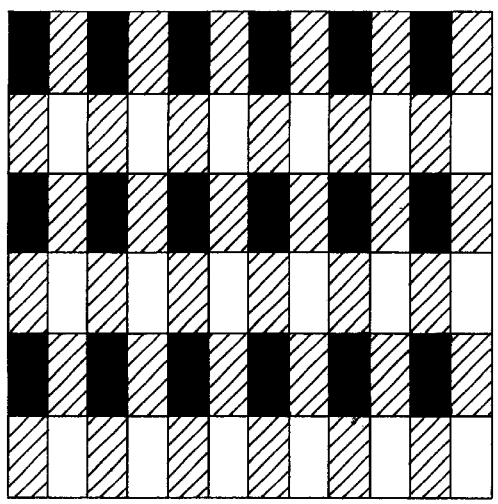
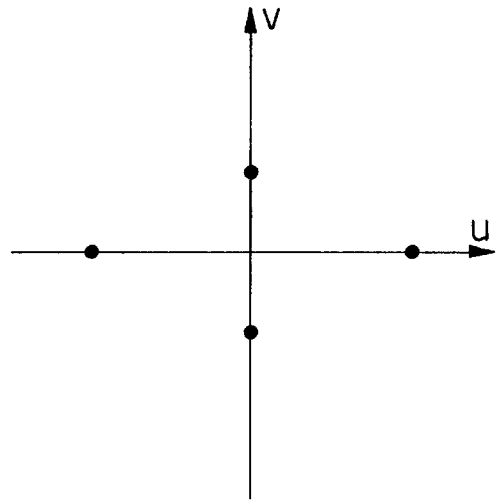
FIG. 12C             FIG. 12D

FILTER PATTERN
(PHASE PATTERN)

PROJECTED PATTERN
(INTERSITY PATTERN)

TUNED FILTER 1
(CONVOLUTION)

TUNED FILTER 2
(CONVOLUTION)

APPARATUS AND METHODS FOR DETERMINING THE THREE-DIMENSIONAL SHAPE OF AN OBJECT USING ACTIVE ILLUMINATION AND RELATIVE BLURRING IN TWO-IMAGES DUE TO DEFOCUS

BACKGROUND OF THE INVENTION

I. Field of the Invention

The present invention relates to techniques for mapping a three-dimensional structure or object from two-dimensional images, and more particularly relates to techniques employing active illumination to retrieve depth information.

II. Description of the Related Art

A pertinent problem in computational vision is the recovery of three-dimensional measurements of a structure from two-dimensional images. There have been many proposed solutions to this problem that can be broadly classified into two categories; passive and active. Passive techniques such as shape from shading and texture attempt to extract structure from a single image. Such techniques are still under investigation and it is expected they will prove complementary to other techniques but cannot serve as stand-alone approaches. Other passive methods, such as stereo and structure from motion, use multiple views to resolve shape ambiguities inherent in a single image. The primary problem encountered by these methods has proved to be correspondence and feature tracking. In addition, passive algorithms have yet to demonstrate the accuracy and robustness required for high-level perception tasks such as object recognition and pose estimation.

Hitherto, high-quality three-dimensional mapping of objects has resulted only from the use of active sensors based on time of flight or light striping. From a practical perspective, light stripe range finding has been the preferred approach. In structured environments, where active radiation of a scene is feasible, it offers a robust yet inexpensive solution to a variety of problems. However, it has suffered from one inherent drawback, namely, speed. To achieve depth maps with sufficient spatial resolution, a large number (say, N) of closely spaced stripes are used. If all stripes are projected simultaneously it is impossible to associate a unique stripe with any given image point, a process that is necessary to compute depth by triangulation. The classical approach is to obtain multiple images, one for each stripe. The requirement for multiple images increases the required time for mapping.

Focus analysis has a major advantage over stereo and structure from motion, as two or more images of a scene are taken under different optical settings but from the same viewpoint, which, in turn, circumvents the need for correspondence or feature tracking. However, differences between the two images tend to be very subtle and previous solutions to depth from defocus have met with limited success as they are based on rough approximations to the optical and sensing mechanisms involved in focus analysis.

Fundamental to depth from defocus is the relationship between focused and defocused images. FIG. 1 shows the basic image formation geometry. All light rays that are radiated by object point P and pass through aperture A, having an aperture diameter a, are refracted by the lens to converge at point Q on the focus image plane $I_f$. For a thin lens, the relationship between the object distance d, focal length of the lens f, and the image distance $d_i$ is given by the Gaussian lens law:

$$\frac{1}{d} + \frac{1}{d_i} = \frac{1}{f}$$

Each point on an object plane that includes point P is projected onto a single point on the image plane $I_f$, causing a clear or focused image to be formed. If, however, a sensor plane such as $I_1$ or $I_2$, does not coincide with the image focus plane and is displaced from it, the energy received from P by the lens is distributed over a patch on the sensor plane. The result is a blurred image of P. It is clear that a single image does not include sufficient information for depth estimation as two scenes defocused to different degrees can produce identical image elements. A solution to depth is achieved by using two images formed on image planes $I_1$ and $I_2$ separated by a known physical distance $\beta$. The problem is reduced to analyzing the relative blurring of each scene point in the two images and computing the distance $\alpha$ to the focused image for each image point. Then, using $d_i=\gamma-\alpha$, the lens law (1) yields depth d of the scene point. Simple as this procedure may appear, several technical problems emerge when implementing a method of practical value.

First, there is the problem of determining relative defocus. In frequency domain, blurring can be viewed as low-pass filtering of the scene texture. Relative blurring can thus in principle be estimated by frequency analysis. However, the local object texture is unknown and variable. Since the effect of blurring is frequency dependent, it is not meaningful to investigate the net blurring of the entire collection of frequencies that constitute scene texture. This observation has forced investigators to use narrow-band filters that isolate more or less single frequencies and estimate their relative attenuation due to defocus in two or more images. Given that the dominant frequencies of the scene are unknown and possibly spatially varying, one is forced to use complex filtering techniques that add to the complexity of the process. This complexity makes the approach impractical for any real-time application.

A second problem with the depth from defocus technique is with respect to textureless surfaces. If the imaged surface is textureless (a white sheet of paper, for instance) defocus and focus produce identical images and any number of filters would prove ineffective in estimating relative blurring. Particularly in structured environments this problem can be addressed by projecting an illumination pattern on the scene of interest, i.e. forcing scene texture. Indeed, illumination projection has been suggested in the past for both depth from defocus and depth from pattern size distortion under perspective projection.

For example, Girod et al., "Depth From Defocus of Structured Light," Proceedings of the SPIE—The Int'l Soc'y for Optical Eng'g, vol. 1194, pp. 209–215 (1990) discloses the use of a structured light source in a depth from defocus range sensing system. Girod projects a structured light pattern (evenly spaced vertical lines) through a large aperture lens onto the object surface. Girod detects a single image which has image characteristics derived from the defocussing effects of the large aperture light source. Girod also suggests use of an anisotropic aperture, e.g., a slit or T-shaped aperture, in connection with the light source to produce orthogonal patterns that can be compared to remove systemic errors due to the limited depth of field of the camera.

Similarly, A. Pentland et al., "Simple Range Cameras Based on Focal Error," J. Optical Soc'y of America, vol. 11, pp. 2925–34 (1994) discloses a structured light sensor which projects a pattern of light (evenly spaced vertical lines) via a simple slide projector onto a scene, measures the apparent blurring of the pattern, and compares it to the known (focused) original light pattern to estimate depth.

Notably, these proposed solutions rely on evaluating defocus from a single image. As a result, they do not take into account variations in the defocus evaluation that can arise from the natural textural characteristics of the object.

When considering a multiple image system, the relation between magnification and focus must be taken into account. In the imaging system shown in FIG. 1, the effective image location of point P moves along ray R as the sensor plane is displaced. Accordingly the defocused image formed on plane $I_1$ is larger than the focused image that would be formed on plane $I_f$ and both of these images are larger than that formed on plane $I_2$. This causes a shift in image coordinates of P that in turn depends on the unknown scene coordinates of P. This variation in image magnification with defocus manifests as a correspondence-like problem in depth from defocus since it is necessary to compare the defocus of corresponding image elements in image planes $I_1$ and $I_2$ to estimate blurring. This problem has been underemphasized in much of the previous work where a precise focus-magnification calibration of motorized zoom-lenses is suggested and where a registration-like correction in image domain is proposed. The calibration approach, while effective, is cumbersome and not viable for many off-the-shelf lenses.

SUMMARY OF THE INVENTION

An object of the present invention is to provide an apparatus for mapping a three-dimensional object from two-dimensional images.

A further object of the present invention is to provide an apparatus and method employing active illumination to retrieve depth information based on focus analysis.

A further object of the present invention is to provide a system that uses inexpensive off-the-shelf imaging and processing hardware.

A further object of the present invention is to provide a system for determining depth information with improved accuracy.

Still a further object of the present invention is to provide a depth from defocus method that uses two scene images which correspond to different levels of focus to retrieve depth information.

Still a further object of the present invention is to provide an apparatus and method for determining depth from defocus analysis based on a careful analysis of the optical, sensing, and computational elements required.

In order to meet these and other objects which will become apparent with reference to further disclosure set forth below, the present invention broadly provides a method for measuring the three-dimensional structure of a object by depth from defocus. The method requires that the scene be illuminated with a preselected illumination pattern, and that at least two images of the scene be sensed, where the sensed images are formed with different imaging parameters. The relative blur between corresponding elemental portions of the sensed images is measured, thereby to determine the relative depth of corresponding elemental portions of said three dimensional structure.

The present invention also provides an apparatus for mapping the three-dimensional structure of an object by depth from defocus. The apparatus includes active illumination means for illuminating the object with a preselected illumination pattern and sensor means, optically coupled to the illuminating means, for sensing at least two images of the object, wherein the sensed images are taken with different imaging parameters. The apparatus also includes depth measurement means, coupled to the sensor means, for measuring the relative blur between the sensed images, thereby to determine the depth of the elemental portions of the object.

Preferably, the images are sensed via constant image magnification sensing as an array having X*Y pixels of predetermined width, and the relative blur is measured on a pixel by pixel basis over the X*Y pixel array, so that depth information is obtained on a pixel by pixel basis over the X*Y array.

In one embodiment, the scene is illuminated by a Xenon light source filtered by a spectral filter having the preselected illuminating pattern. The spectral filter may be selected so as to produce an illumination pattern which generates multiple spatial frequencies for each image element sensed. In a different embodiment, the light source is a monochromatic laser light source, and at least two depth images of the scene formed by the laser light and at least one brightness image of the scene formed by ambient light are sensed. In this embodiment, the relative blur between the sensed laser light images is measured.

Preferably, the preselected illumination pattern is optimized so that a small variation in the degree of defocus results in a large variation in the measured relative blur. The optimized illumination pattern advantageously takes the form of a rectangular grid pattern, and is preferably selected to have a grid period which is substantially equal to twice the pixel array element width and a registration phase shift being substantially equal to zero with respect to the sensing array, in two orthogonal directions. Alternatively, the optimized illumination pattern may have a period which is substantially equal to four times the pixel element width and a registration phase shift being substantially equal to $\pi/4$ with respect to the sensing array in two orthogonal directions.

In a preferred embodiment, two images are sensed, a first image at a position corresponding to a near focused plane in the sensed scene, and a second image at a position corresponding to a far focused plane in the sensed scene.

Half-mirror optics may be provided so that the illumination pattern and the scene images pass along the same optical axis.

Polarization optics which polarize both the illumination pattern and the scene images in controlled polarization directions may be used to filter specular reflections from the object.

Advantageously, the sensed images are converted into digital signals on a pixel by pixel basis, and are then convolved to determine power measurement signals that correspond to the fundamental frequency of the illumination pattern at each pixel for each sensed scene image. The power measurement signals are preferably corrected for misregistration on a pixel by pixel basis, such that any errors introduced into the power measurement signals because of misalignment between the sensing pixels of the grid and the illumination pattern is corrected. Correction may be effectuated by multiplying each of the power measurement signals, on a pixel by pixel basis, by the sum of the squares of the power measurement signal's four neighboring power measurement signals. In addition, the power measurement signals are preferably normalized on a pixel by pixel basis.

The power measurement signals for one of the sensed images are compared, on a pixel by pixel basis, with determined power measurements for a second sensed image to determine depth information at each pixels. Look-up table mapping may be used for such comparison.

The pixel by pixel depth information is preferably arranged as a depth map and may be displayed as a wireframe on a bitmapped workstation. If both laser-light depth images and ambient light brightness images are sensed, the brightness image may be preferably displayed concurrently with the depth map so that the three-dimensional structure of the sensed scene and the actual scene picture are concurrently displayed as a texturemap.

Based on the above techniques, both textured and textureless surfaces can be recovered by using an optimized illumination pattern that is registered with an image sensor. Further, constant magnification defocusing is provided in a depth-from-defocus imaging technique. Accordingly, techniques for real-time three-dimensional imaging are provided herein which produce precise, high resolution depth maps at frame rate.

The accompanying drawings, which are incorporated and constitute part of this disclosure, illustrate a preferred embodiment of the invention and serve to explain the principals of the invention.

BRIEF DESCRIPTION OF THE DRAWINGS

FIGS. 10A to 10D show alternate arrangements for polarization control in the apparatus of the invention.

FIGS. 11A to F show an alternate grid pattern and the use of tuned filtering to provide two ranges of depth determination therefrom.

FIGS. 12A through D show further alternate grid patterns and the frequency response thereto.

DESCRIPTION OF THE PREFERRED EMBODIMENTS

Figure 1:
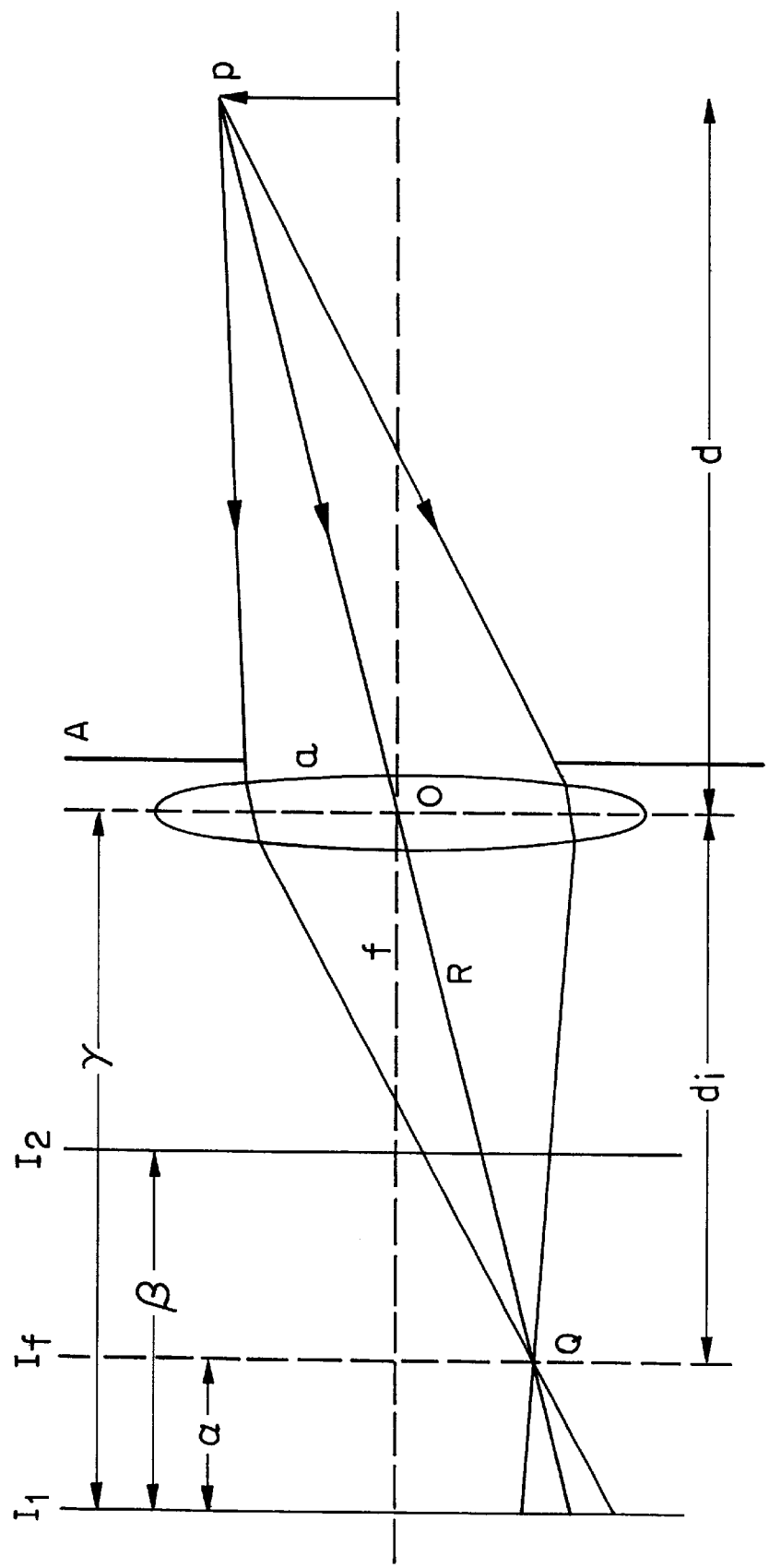
FIG. 1 is a simplified diagram illustration the formation of images with a lens.

Reference will now be made in detail to the present preferred embodiment of the invention as illustrated in the drawings.

Figure 2:
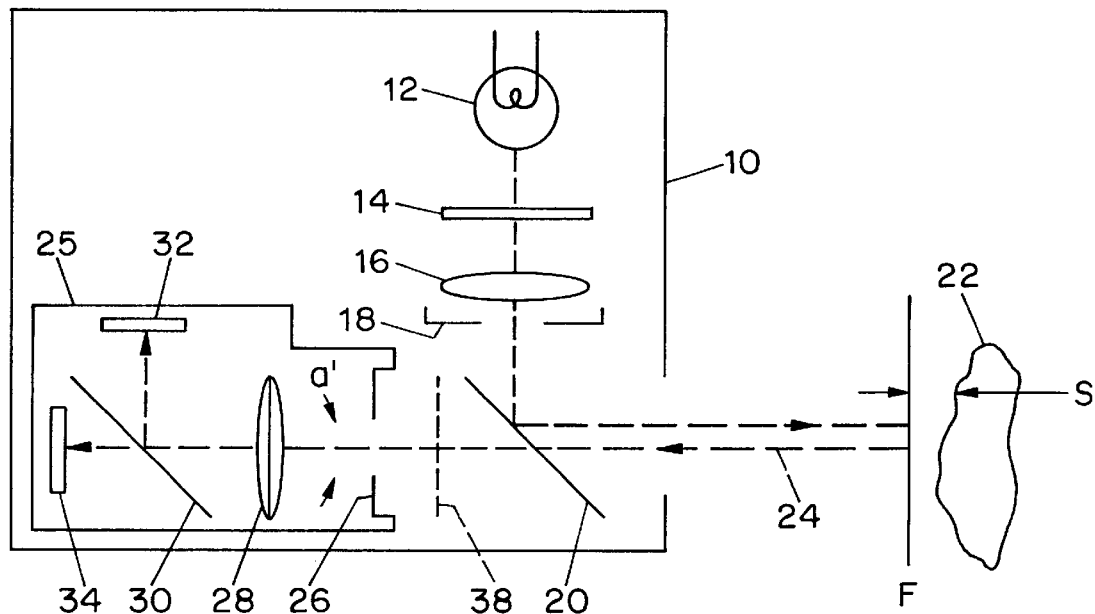
FIG. 2 is a simplified diagram showing the arrangement of the optical portions of the present invention.

FIG. 2 is a simplified optical diagram showing an apparatus 10 for mapping the three dimensional image of an object 22 within its field of view. The apparatus 10 includes a light source 12, preferably of high intensity, such as a Xenon arc lamp, a strobe light or a laser source. Light source 12 illuminates a partially transparent screen 14 having a two dimensional grid to be projected as illumination onto object 22. A lens 16 aperture 18 and beam splitter 20 are provided such that an image of the screen 14 is projected onto object 22 along optical axis 24. Such active illumination provides a well defined texture to object 22 as viewed from the apparatus 10. In connection with measuring depth by defocus elemental image portions of the object 22 can only be measured where they have a defined texture, the defocus of which can be observed in the apparatus 10. The grid illumination pattern provides a forced and well defined texture onto object 22.

The apparatus 10 is arranged so that light from light source 12 is projected along the same optical axis 24 from which object 22 is observed. For this reason a beam splitting reflector 20 is provided to project the illumination in the direction of object 22. Reflector 20, which is illustrated as a plane mirror may preferably be a prism beam splitter.

Light from the illumination grid pattern as reflected from object 22 along the optical axis 24 passes through beam splitter 20 into a detection apparatus 25. Apparatus 25 includes a focal plane aperture 26 and lens 28 for providing invariance of image magnification with variation in the image plane, also referred to as a telecentric lens system. A second beam splitter 30 deflects images of object 22 onto image detecting arrays 32 and 34, each of which has a different spacing along the optical axis from lens 28 to provide a pair of detected images which have different degrees of defocus, but identical image magnification.

The characteristics of a telecentric lens system using a single lens will be described in connection with the diagram of FIG. 3. As previously discussed with respect to FIG. 1, a point P on an object is imaged by a lens 28 onto a point Q on the focus plane $I_f$ corresponding to the image distance $d_i$ from lens 28. Image distance $d_i$ is related to the object distance d from lens 28 to point P on the object by the lens formula (1). At image planes $I_1$ which is spaced by distance $\alpha$ from the focus plane $I_f$, a blurred image corresponding to an enlarged circular spot will result from the defocusing of object point P. Likewise, a blurred image of point P will be formed on image plan $I_2$, located a distance $\beta$ from image plane $I_1$. Image planes $I_1$ and $I_2$ are on opposite sides of focus plane $I_f$. The objective of the telecentric lens system, wherein aperture 26 is located a distance f, corresponding to the focal length of lens 28, in front of the lens 28 is that the size of the resulting images on image planes $I_1$ and $I_2$ will be the same as the ideal image that would be projected on focus plane $I_f$. This is evident from the fact that the optical center of the refracted image path behind lens 28, which is designated by R' is parallel to the optical axis 24. Of course, those skilled in the art will appreciate that the location of the apparatus will depend on the optical properties of the lens chosen. Indeed, certain lenses are manufactured to be telecentric and do not require an additional aperture.

In the apparatus 10 of FIG. 2 image planes 32 and 34 are located at different optical distances from lens 28 corresponding, for example, to image planes $I_1$ and $I_2$ respectively. Because a telecentric lens system is used the images detected on these image planes will have identical image size and corresponding locations of image elements with different amounts of defocus resulting from the different distances from lens 28 along the optical paths to the image planes.

Figure 2A:
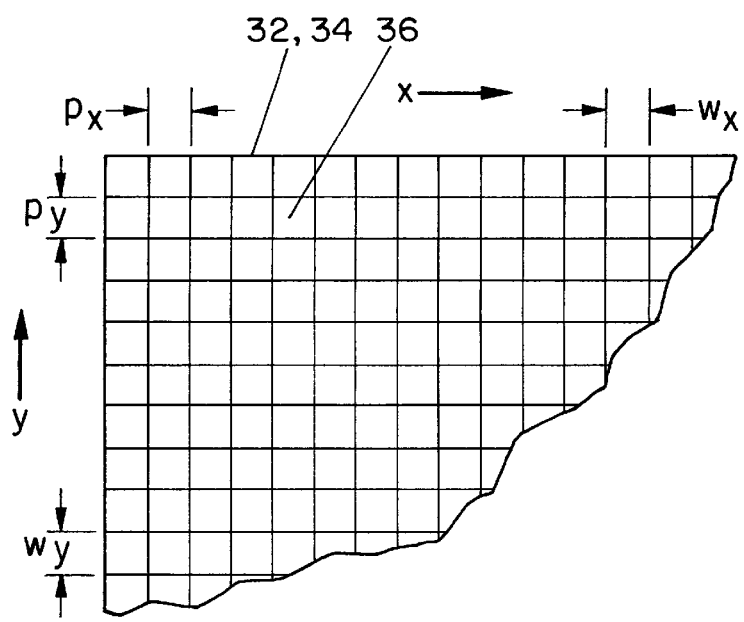
FIG. 2A is a plan view of the image detectors used in the FIG. 1 apparatus.

FIG. 2A is a plan view from the incident optical axis of image sensors 32, 34, which are preferably charge coupled devices (CCD). In a preferred arrangement, the image planes consists of image sensing cells 36 which are preferably arranged in an array of 512 by 480 elements at regular spacings $p_x$ and $p_y$ along the x and y directions. The CCD image detector is preferred for use in the systems of the present invention because of the digital nature of signal sampling elements, which facilitates precise identification of picture elements in two image planes 32 and 34 so that a correlation can be made between the image elements. Alternatively other image sampling devices, such as a television receptor tubes can be used with appropriate analog-to-digital conversion. However, the use of such analog devices may result in possible loss of precision in determining the defocus effect upon which the present system depends for depth perception.

Figure 4A:
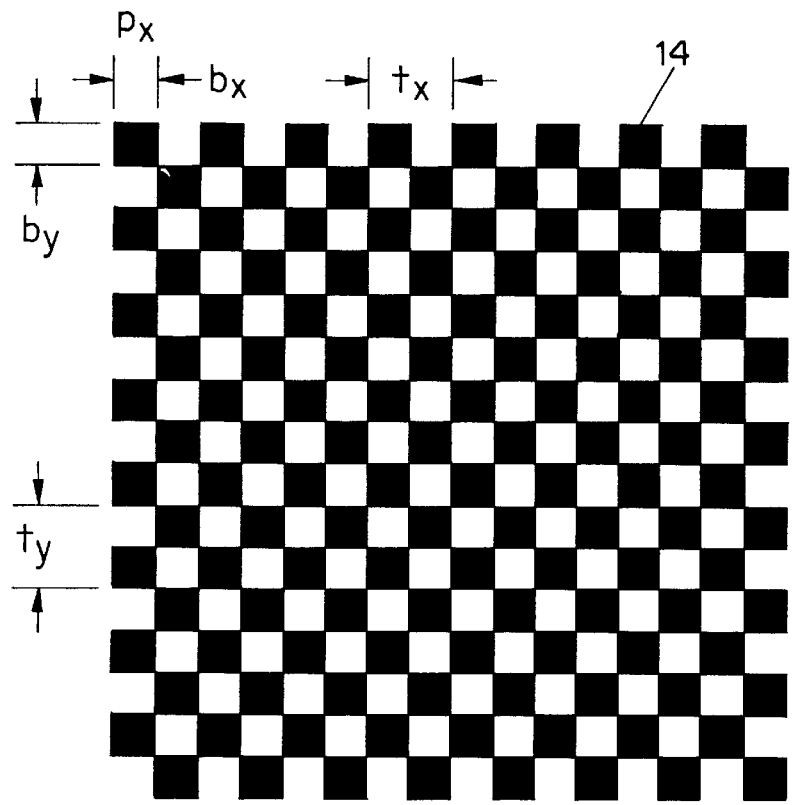
FIGS. 4A and 4B show the preferred arrangements of rectangular grids for the projection screen used in the FIG. 2 embodiment.

FIG. 4A is a plan view of a screen 14 according to one of the preferred embodiments of the present invention. The screen 14 may be formed on a glass substrate, for example by photo-etching techniques, and has a checkerboard grid of alternating transparent and opaque elements of a size $b_x$ times $b_y$ and periodicity $t_x$ and $t_y$, which is selected such that the individual black and white checkerboard squares of grid 14 project images which, after reflecting off the object 22, are incident on the photo image detectors 32 and 34 with an image grid element size corresponding to the size and periodicity of image detecting elements 36 in arrays 32 and 34. Accordingly, the illumination grid period ($t_x$, $t_y$) of the projected grid image on the photo detector arrays is twice the spacing ($p_x$, $p_y$) of the imaging elements of the array, which corresponds to the detected pixel elements of the image. Those skilled in the art will recognize that the defocused images of grid 14 on individual pixel elements of detectors 32 and 34 will be defocused from the ideal image by reason of the spacing of arrays 32 and 34 from the ideal focusing plane of the image. The amount of such defocusing for each image element and for each detector array is a function of the spacing S of the corresponding object portion from the ideal focused plane F in the object field for the corresponding detector array. By detecting image intensity in each of the detecting pixel elements 36 of detecting arrays 32, 34, it is possible to derive for each defocused image on detecting arrays 32, 34 the amount of. defocusing of the projected grid which results from the spacing S of the corresponding object portion from the plane of focus F in the object field for that array. Accordingly, two measurements of the defocus factor, as described below are obtained for each elemental area of the object, and such defocus factors are used to compute a normalized defocus measure which can be directly mapped to the depth of the corresponding object portion corresponding to the pixel element, as will be described below.

Optimization Process

In order to better describe the principles of operation of the method and apparatus of the present invention, it is useful to have an understanding of the analytical techniques by which the optimum parameters of the apparatus and method were determined. Such analytical techniques take into account modeling of both the illumination and imaging functions to analyze the physical and computational parameters involved in the depth from defocus determination, and its application to varying object field requirements.

There are five different elements, or components, that play a critical role. We briefly describe them before proceeding to model them.

1. Illumination Pattern: The exact pattern used to illuminate the scene determines its final texture. The spatial and spatial frequency characteristics of this texture determine the behavior of the focus measure and hence the accuracy of depth estimation. It is the parameters of this component that we set out to optimize so as to achieve maximum depth accuracy.

2. Optical Transfer Function: The finite size of the lens aperture 26 imposes restrictions on the range of spatial frequencies that are detectable by the imaging system. These restrictions play a critical role in the optimization of the illumination pattern. Upon initial inspection, the optical transfer function (OTF) seems to severely constrain the range of useful illumination patterns. However, as we shall see, the OTF's limited range also enables us to avoid serious problems such as image aliasing.

3. Defocusing: The depth d of a surface point is directly related to its defocus (or lack of it) on the image plane. It is this phenomenon that enables us to recover depth from defocus. It is well-known that defocus is essentially a low-pass spatial filter. However, a realistic model for this phenomenon is imperative for focus analysis. Our objective is to determine depth from two images on planes $I_1$ and $I_2$ by estimating the plane of best focus $I_f$ for each scene point P.

4. Image Sensing: The two images used for shape recovery are of course discrete. The relationship between the continuous image formed on the sensor plane and the array discrete image used in computations is determined by the shape and spatial arrangement of sensing elements 36 (pixels) on the image detectors 32, 34. As will be shown, the final illumination pattern 14 will include elements that are comparable to the size $p_x$, $p_y$ of each pixel on the sensor array. Therefore, an accurate model for image sensing is essential for illumination optimization.

5. Focus Operator: The relative degree of defocus in two images is estimated by using a focus operator. Such an operator is typically a high-pass filter and is applied to discrete image elements. Interestingly, the optimal illumination pattern is also dependent on the parameters of the focus operator used.

All the above factors together determine the relation between the depth d of a scene point P and its two focus measures. Therefore, the optimal illumination grid 14 is viewed as one that maximizes the sensitivity and robustness of the focus measure function. To achieve this each component is modeled in spatial as well as Fourier domains. Since we have used the telecentric lens (FIG. 3) in our implementation, it's parameters are used in developing each model. However, all of the following expressions can be made valid for the classical lens system (FIG. 2) by $$\frac{f}{a}, \text{by } \frac{d_i}{a}.$$

Illumination Pattern

Before the parameters of the illumination grid 14 can be determined, an illumination model must be defined. Such a model must be flexible in that it must subsume a large enough variety of possible illumination patterns. In defining the model, it is meaningful to take the characteristics of the other components into consideration. As we will describe shortly, the image sensors 32, 34 used have rectangular sensing elements 36 arranged on a rectangular spatial array as shown in FIG. 2A. With this in mind, we define the following illumination model. The basic building block of the model is a rectangular illuminated patch, or cell, with uniform intensity:

$$i_c(x, y) = i_c(x, y; b_x, b_y) = {}^2\Pi\left(\frac{1}{b_x}x, \frac{1}{b_y}y\right) \quad (2)$$

where, ${}^2\Pi()$ is the two-dimensional Rectangular function. The unknown parameters of this illumination cell are $b_x$ and $b_y$, the length and width of the cell.

Figure 4B:
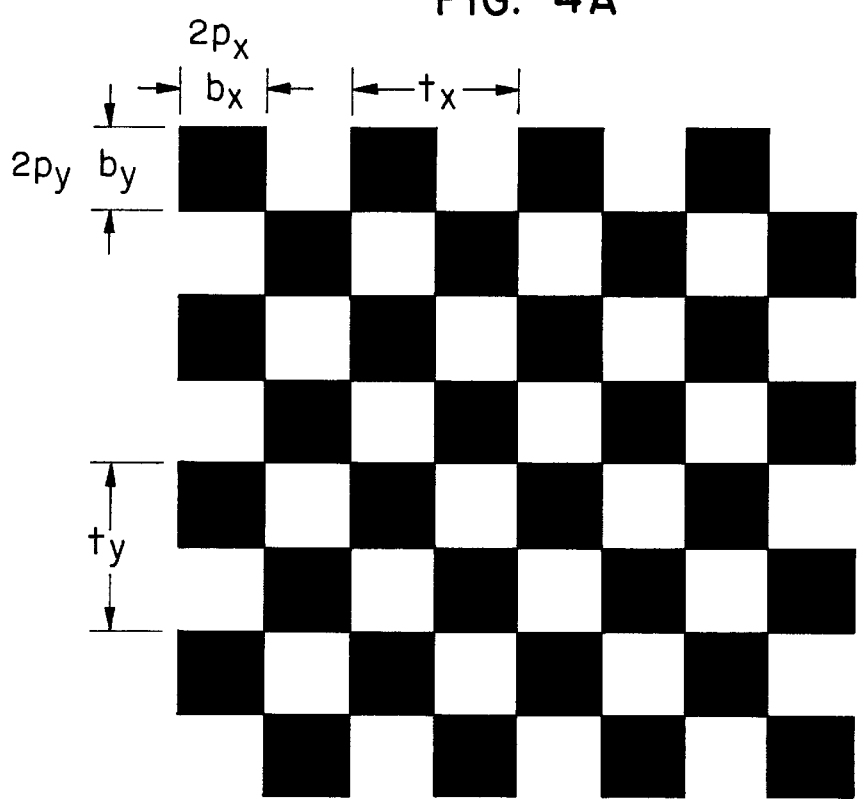

This cell is assumed to be repeated on a two-dimensional gric to obtain a periodic pattern as shown in FIGS. 4A and 4B. This periodicity is essential since our goal is to achieve spatial invariance in depth accuracy, i.e. all image regions, irrespective of their distance from each other, must possess the same textural characteristics. The periodic grid is defined as:

$$i_g(x, y) = i_g(x, y; t_x, t_y) \qquad (3)$$
$$= {}^2III\left(\frac{1}{2}\left(\frac{1}{t_x}x + \frac{1}{t_y}y\right), \frac{1}{2}\left(\frac{1}{t_x}x - \frac{1}{t_y}y\right)\right)$$

where, $^2III()$ is the 2-dimensional Shah function, and $2t_x$ and $2t_y$ determine the periods of the grid in the x and y directions. Note that this grid is not rectangular but has vertical and horizontal symmetry on the x-y plane. The final illumination pattern i(x,y) is obtained by convolving the cell $i_c(x,y)$ with the grid $i_g(x,y)$:

$$i(x, y) = i(x, y; b_x, b_y, t_x, t_y) = i_c(x, y) * i_g(x, y) \qquad (4)$$

The exact pattern is therefore determined by four parameters, namely, $b_x$, $b_y$, $t_x$ and $t_y$. The above illumination grid is not as restrictive as it may appear upon initial inspection. For instance, $b_x$, $b_y$, $2t_x$ and $2t_y$ can each be stretched to obtain repeated illumination and non-illumination stripes in the horizontal and vertical directions, respectively. Alternatively, they can also be adjusted to obtain a checkerboard illumination pattern with large or small illuminated patches. The exact values for $b_x$, $b_y$, $t_x$ and $t_y$ will be evaluated by the optimization procedure described later. In practice, the illumination pattern determined by the optimization is used to fabricate a screen with the same pattern.

The optimization procedure requires the analysis of each component of the system in spatial domain as well as frequency domain (u,v). The Fourier transforms of the illumination cell, grid, and pattern are denoted as $I_c(u,v)$, $I_g(u,v)$, and I(u,v), respectively, and found to be:

$$I_c(u, v) = I_c(u, v; b_x, b_y) = b_x \frac{\sin(\pi b_x u)}{\pi b_x u} \cdot b_y \frac{\sin(\pi b_y v)}{\pi b_y v} \qquad (5)$$

$$I_g(u, v) = I_g(u, v; t_x, t_y) = {}^2III((t_x u + t_y v), (t_x u - t_y v)) \qquad (6)$$

$$I(u, v) = I(u, v; b_x, b_y, t_x, t_y) = I_c(u, v) \cdot I_g(u, v) \qquad (7)$$

Optical Transfer Function

Figures 5, 6A, 6C, 6D:
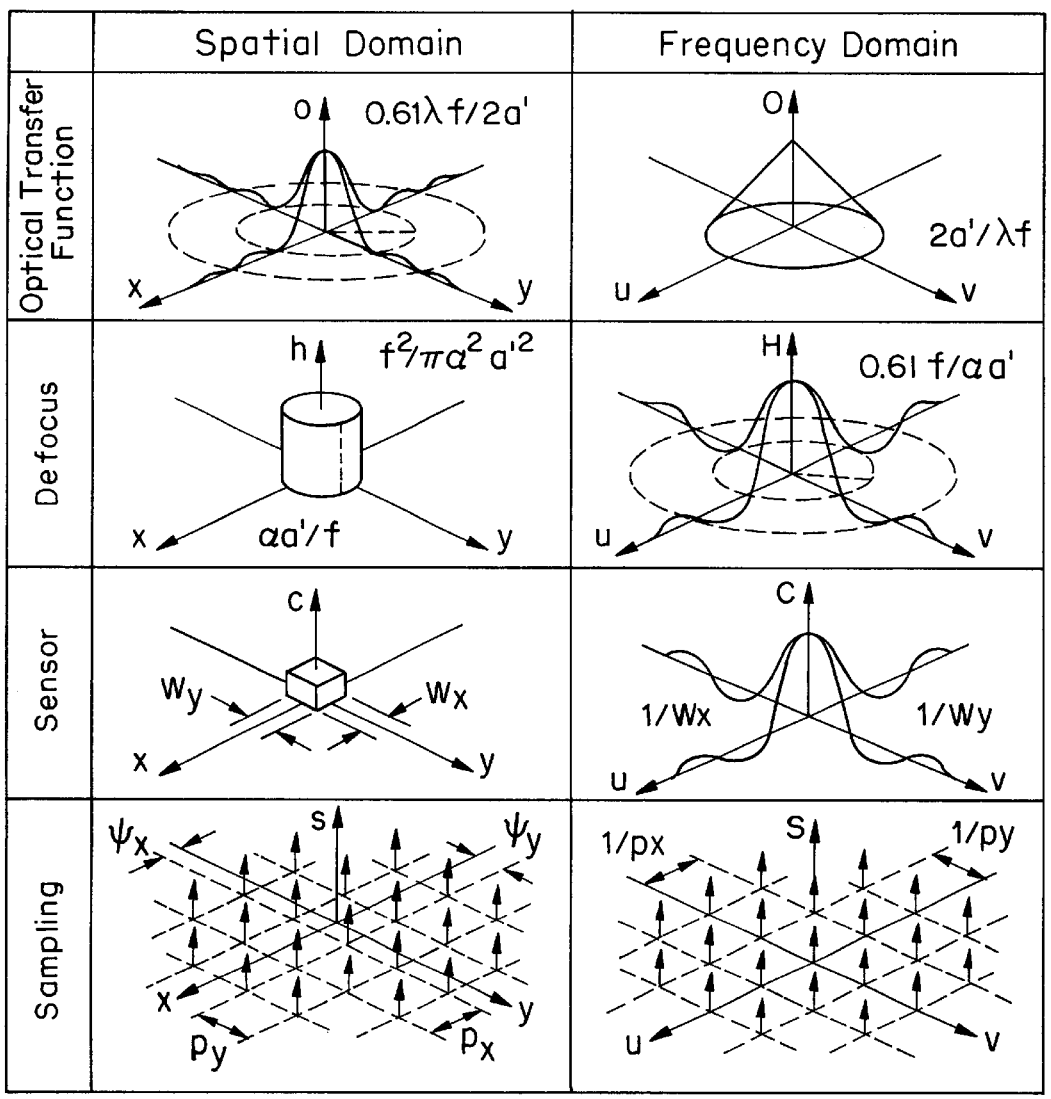
FIG. 5 is a diagram showing the spatial and frequency domain function for optimization of the system of the present invention.

Adjacent points on the illuminated surface reflect light waves that interfere with each other to produce diffraction effects. The angle of diffraction increases with the spatial frequency of surface texture. Since the lens aperture 26 of the imaging system 25 (FIG. 2) is of finite radius a', it does not capture the higher order diffractions radiated by the surface. This effect places a limit on the optical resolution of the imaging system, which is characterized by the optical transfer function (OTF):

$$O(u, v) = O(u, v; a', f) \qquad (8)$$
$$= \begin{cases} \left(\frac{a'}{f}\right)^2 (\gamma - \sin\gamma), & \sqrt{u^2 + v^2} \le \frac{2a'}{\lambda f} \\ 0, & \sqrt{u^2 + v^2} > \frac{2a'}{\lambda f} \end{cases}$$

where $\gamma = 2\cos^{-1}\left(\frac{\lambda f}{a'}\frac{\sqrt{u^2+v^2}}{2}\right)$.

where, (u,v) is the spatial frequency of the two-dimensional surface texture as seen from the image side of the lens, f is the focal length of the lens, and $\lambda$ is the wavelength of incident light. It is clear from the above expression that only spatial frequencies $$\frac{2a'}{\lambda f}$$

will be imaged by the optical system (FIG. 5). This in turn places restrictions on the frequency of the illumination pattern. Further, the above frequency limit can be used to "cut off" any desired number of higher harmonics produced by the illumination pattern. In short, the OTF is a curse and a blessing; it limits the detectable range of frequencies and at the same time can be used to minimize the detrimental effects of aliasing and high-order harmonics.

Defocusing

Figure 3:
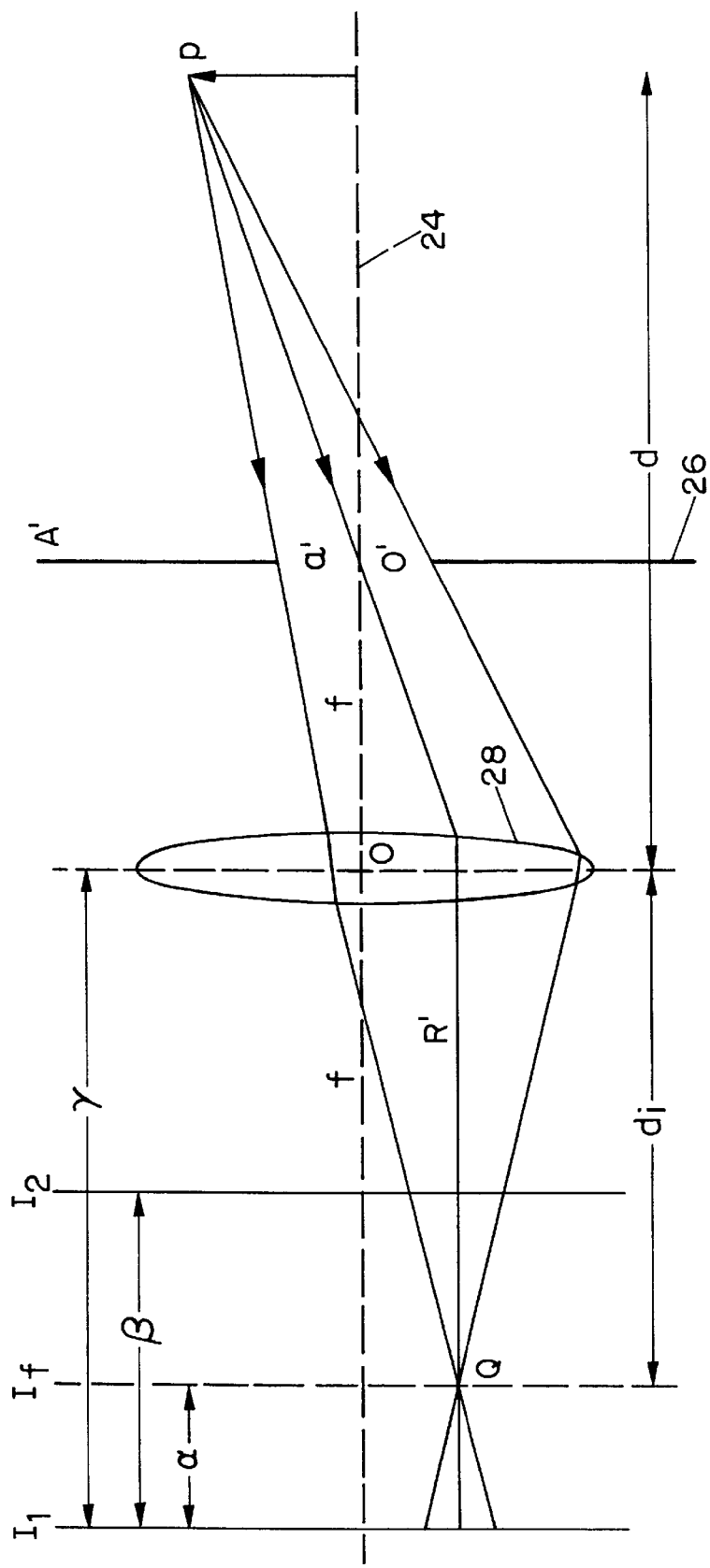
FIG. 3 is a plan view of the image detectors used in the FIG. 2 apparatus.

Referring to FIG. 3, α is the distance between the focus image plane $I_f$ of a surface point P and its defocused image formed on the sensor plane $I_1$. The light energy radiated by the surface point and collected by the imaging optics is uniformly distributed over a circular patch on the sensor plane. This patch, also called the pillbox, is the defocus function (FIG. 7):

$$h(x, y) = h(x, y; \alpha, a', f) = \frac{f^2}{2\pi a'^2 \alpha^2} \Pi\left(\frac{d}{2a\alpha}\sqrt{x^2 + y^2}\right) \qquad (9)$$

where, once again, a' is the radius of the telecentric lens aperture. In Fourier domain, the above defocus function is given by:

$$H(u, v) = H(u, v; \alpha, a', f) = \frac{f}{2\pi a'\alpha\sqrt{u^2+v^2}} J_1\left(\frac{2\pi a'\alpha}{f}\sqrt{u^2+v^2}\right) \qquad (10)$$

where $J_1$ is the first-order Bessel function. As is evident from the above expression, defocus serves as a low-pass filter. The bandwidth of the filter increases as a x decreases, i.e. as the sensor plane $I_1$ gets closer to the focus plane $I_f$. In the extreme case of α=0, H(u,v) passes all frequencies without attenuation producing a perfectly focused image. Note that in a defocused image, all frequencies are attenuated at the same time. In the case of passive depth from focus or defocus, this poses a serious problem; different frequencies in an unknown scene are-bound to have different (and unknown) magnitudes and phases. It is difficult therefore to estimate the degree of defocus of an image region without the use of a large set of narrow-band focus operators that analyze each frequency in isolation. This again indicates that it would be desirable to have an illumination pattern that has a single dominant frequency, enabling robust estimation of defocus and hence depth.

Image Sensing

We assume the image sensor to be a typical CCD sensor array. Such a sensor can be modeled as a rectangular array 32, 34 of rectangular sensing elements 36 (pixels). The quantum efficiency of each sensor 36 is assumed to be uniform over the area of the pixel. Let m(x,y) be the continuous image formed on the sensor plane. The finite pixel area has the effect of averaging the continuous image m(x,y). In spatial domain, the averaging function is the rectangular cell:

$$s_c(x, y) = s_c(x, y; w_x, w_y) = {}^2\Pi\left(\frac{1}{w_x}x, \frac{1}{w_y}y\right) \quad (11)$$

where, $w_x$ and $w_y$ are the width and height of the said sensing element 36, respectively. The discrete image is obtained by sampling the convolution of m(x,y) with $s_c(x,y)$. This sampling function is a rectangular grid:

$$s_g(x, y) = \qquad (12)$$
$$s_g(x, y; p_x, p_y, \varphi_x, \varphi_y) = \frac{1}{p_x p_y}{}^2\Pi\left(\frac{1}{p_x}(x-\varphi_x), \frac{1}{p_y}(y-\varphi_y)\right)$$

where, $p_x$ and $p_y$ are spacings between discrete samples in the two spatial dimensions, and ($\psi_x$, $\psi_y$) is phase shift of the grid. The final discrete image is therefore:

$$n_d(x,y)=(s_c(x,y)*m(x,y))\cdot s_g(x,y) \quad (13)$$

The parameters $w_x$, $w_y$, $p_x$, and $p_y$ are all determined by the particular image sensor used. These parameters are therefore known and their values are substituted after array optimization is done. On the other hand, the phase shift ($\psi_x$, $\psi_y$) of the sampling function is with respect to the illumination pattern and will also be viewed as illumination parameters during optimization. To recognize the importance of these phase parameters one can visualize the variations in a discrete image that arise from simply translating a high-frequency illumination pattern with respect to the sensing grid.

In Fourier domain, the above averaging and sampling functions are:

$$S_c(u, v) = S_c(u, v; w_x, w_y) = w_x \frac{\sin(\pi w_x u)}{\pi w_x u} \cdot w_y \frac{\sin(\pi w_y v)}{\pi w_y v} \quad (14)$$

$$S_g(u, v) = S_g(u, v; p_x, p_y, \varphi_x, \varphi_y) \quad (15)$$
$$= {}^2\Pi(p_x u, p_y v) \cdot e^{-i2\pi(\varphi_x u + \varphi_y v)}$$

The final discrete image is:

$$I_d(u,v)=(S_c(u,v)\cdot M(u,v))*S_g(u,v) \quad (16)$$

Focus Operator

Since defocusing has the effect of suppressing high-frequency components in the focused image, it desirable that the focus operator respond to high frequencies in the image. For the purpose of illumination optimization, we use the Laplacian. However, the derived pattern will remain optimal for a large class of symmetric focus operators. In spatial domain, the discrete Laplacian is:

$$x,y)=l(x,y;q_x,q_y)=4\delta(x)\cdot\delta(y)-[\delta(x)\cdot\delta(y-q_y)+\delta(x)\cdot\delta(y+q_y)+\delta(x-q_x)\cdot\delta(y)+\delta(x+q_x)\cdot\delta(y)] \quad (17)$$

Here, $q_x$, and $q_y$, are the spacings between neighboring elements of the discrete Laplacian kernel. In the optimization, these spacings will be related to the illumination parameters. The Fourier transform of the discrete Laplacian is:

$$(u,v)=L(u,v;q_x,q_y)=2(1-\cos(2\pi q_x u))*\delta(u)+2(1-\cos(2\pi q_y v))*\delta(v)=4-2\cos(2\pi q_x u)-2\cos(2\pi q_y v) \quad (18)$$

The required discrete nature of the focus operator comes with a price. It tends to broaden the bandwidth of the operator. Once the pattern has been determined, the above filter will be tuned to maximize sensitivity to the fundamental illumination frequency while minimizing the effects of spurious frequencies caused either by the scene's inherent texture or image noise.

Focus Measure

The focus measure is simply the output of the focus operator. It is related to defocus α (and hence depth d) via all of the components modeled above. Note that the illumination pattern ($i_c*i_g$) is projected through optics that is similar to that used for image formation. Consequently, the pattern is also subjected to the limits imposed by the optical transfer function o and array defocus function h. Therefore, the texture projected on the scene is:

$$i(x,y;b_x,b_y,t_x,t_y)*o(x,y;a',f)*h'(x,y;\alpha',a',f) \quad (19)$$

where, α' represents defocus of the illumination itself that depends on the depth of the illuminated point. However, the illumination pattern once incident on a surface patch plays the role of surface texture and hence defocus α' of illumination does not have any significant effect on depth estimation. The projected texture is reflected by the scene and projected by the optics back onto the image plane to-produce the discrete image:

$$\{i(x,y;b_x,b_y,t_x,t_y)*o(x,y;a',f)^{*2}*h'(x,y;\alpha',a',f)*h(x,y;\alpha',a',f)\,*s_c(x,y;w_x,w_y)\}\cdot s_g(x,y;p_x,p_y,\psi_x,\psi_y) \quad (20)$$

where, $o^{*2}=o*o$. The final focus measure function g(x,y) is the result of applying the discrete Laplacian to the above discrete image:

$$x,y)=\{(i(x,y;b_x,b_y,t_x,t_y)*o(x,y;a',f)^{*2}*h'(x,y;\alpha',a',f)*h'(x,y;\alpha,a',f)*s_c(x,y;w_x,w_y))\cdot s_g(x,y;p_x,p_y,\psi_x,\psi_y)\}*l(x,y;q_x,q_y)=\{(i*o^{*2}*h'^{*2}*s_c)\cdot s_g\}*l \quad (21)$$

Since the distance between adjacent weights of the Laplacian kernel must be integer multiples of the period of the image sampling function $s_g$, the above expression can be rearranged as:

$$x,y)=(i*o^{*2}*h'*h*s_c*l)\cdot s_g=g_o\cdot s_g \quad (22)$$

where, $g_o=i*o^{*2}*h'*h*s_c*l$. The same can be expressed in Fourier domain as:

$$G(u,v)=(I\cdot O^2\cdot H'\cdot H\cdot S_c\cdot L)*S_g=G_o*S_g \quad (23)$$

The above expression gives us the final output of the focus operator for any value of the defocus parameter α. It will be used in the following section to determine the optimal illumination pattern.

Optimization

In our implementation, the illumination grid projected on the object 22 using a high power light source and a telecentric lens identical to the one used to image the scene. This allows us to assume that the projected illumination is the primary cause for surface texture and is stronger than the natural texture of the surface. Consequently our results are applicable not only to textureless surfaces but also textured ones. The illumination optimization problem is formulated as follows: Establish closed-form relationships between the illumination parameters ($b_x$, $b_y$, $t_x$, $t_y$), sensor parameters ($w_x$, $w_y$, $p_x$, $p_y$, $\psi_x$, $\psi_y$), and discrete Laplacian parameters ($q_x$, $q_y$) so as to maximize the sensitivity, robustness, and spatial resolution of the focus measure g(x,y). High sensitivity implies that a small variation in the degree of focus results in a large variation in g(x,y). This would ensure high depth estimation accuracy in the presence of image noise, i.e. high signal-to-noise ratio. By robustness we mean that all pixel sensors 36 with the same degree of defocus produce the same focus measure independent of their location on the image plane. This ensures that depth estimation accuracy is invariant to location on the image plane. Lastly, high spatial resolution is achieved by minimizing the size of the focus operator. This ensures that rapid depth variations (surface discontinuities) can be detected with high accuracy.

In order to minimize smoothing effects and maximize spatial resolution of computed depth, the support (or span) of the discrete Laplacian must be as small as possible. This in turn requires that the frequency of the illumination pattern be as high as possible. However, the optical transfer function described in section 4.2 imposes limits on the highest spatial frequency that can be imaged by the optical system. This maximum allowable frequency is $$\frac{2a'}{\lambda f},$$

determined by the numerical aperture of the telecentric lens. Since the illumination grid pattern is periodic, its Fourier transform must be discrete. It may have a zero-frequency component, but this can be safely ignored since the Laplacian operator, being a sum of second-order derivatives, will eventually remove any zero-frequency component in the final image. Our objective then is to maximize the fundamental spatial frequency ($1/t_x$, $1/t_y$) of the illumination pattern. In order to maximize this frequency while maintaining high detectability, we must have $\sqrt{(1/t_x)^2+(1/t_y)^2}$ close to the optical limit $$\frac{2a'}{\lambda f}.$$

This in turn pushes all higher frequencies in the illumination pattern outside is the optical limit. What we are left with is a surface texture whose image has only the quadruple fundamental frequencies ($\pm 1/t_x, \pm 1/t_y$). As a result, these are the only frequencies we need consider in our analysis of the focus measure function G(u,v).

Before we consider the final measure G(u,v), we examine $G_o(u,v)$ the focus measure prior to image sampling. For the reasons given above, the two-dimensional $G_o(u,v)$ is reduced to four discrete spikes at ($1/t_x$, $1/t_y$), ($1/t_x$, $-1/t_y$), ($-1/t_x$, $1/t_y$) and ($-1/t_x$, $-1/t_y$). Since all components (I, O, H, $S_c$ and L) of $G_o$ are reflection symmetric about u=0 and v=0, we have:

$$G_0\left(\frac{1}{t_x},\frac{1}{t_y}\right) = G_0\left(\frac{1}{t_x},-\frac{1}{t_y}\right) = G_0\left(-\frac{1}{t_x},\frac{1}{t_y}\right) = G_0\left(-\frac{1}{t_x},-\frac{1}{t_y}\right) \quad (24)$$

where $$G_0\left(\frac{1}{t_x},\frac{1}{t_y}\right) = I\left(\frac{1}{t_x},\frac{1}{t_y};b_x,b_y,t_x,t_y\right) \cdot O^2\left(\frac{1}{t_x},\frac{1}{t_y};a',f\right) \cdot \quad (25)$$

$$H'\left(\frac{1}{t_x},\frac{1}{t_y};a',a',f\right) \cdot H\left(\frac{1}{t_x},\frac{1}{t_y};\alpha,a',f\right) \cdot$$

$$S_c\left(\frac{1}{t_x},\frac{1}{t_y};w_x,w_y\right) \cdot L\left(\frac{1}{t_x},\frac{1}{t_y};q_x,q_y\right).$$

Therefore, in frequency domain the focus measure function prior to image sampling reduces to:

$$G_0(u,v) = G_0\left(\frac{1}{t_x},\frac{1}{t_y}\right) \cdot \quad (26)$$

$$\left\{\delta\left(u-\frac{1}{t_x},v-\frac{1}{t_y}\right) + \delta\left(u+\frac{1}{t_x},v-\frac{1}{t_y}\right) + \right.$$

$$\left.\delta\left(u-\frac{1}{t_x},v+\frac{1}{t_y}\right) + \delta\left(u+\frac{1}{t_x},v+\frac{1}{t_y}\right)\right\}$$

The function $g_o(x,y)$ in image domain, is simply the inverse Fourier transform of $G_o(u,v)$:

$$g_0(x,y) = G_0\left(\frac{1}{t_x},\frac{1}{t_y}\right) \cdot \left\{4\cos 2\pi\frac{1}{t_x}x \cdot \cos 2\pi\frac{1}{t_y}y\right\} \quad (27)$$

Note that $g_o(x,y)$ is the product of cosine functions weighted by the coefficient $G_o(1/t_x, 1/t_y)$. The defocus function h has the effect of reducing the coefficient $G_o(1/t_x, 1/t_y)$ in the focus measure $g_o(x,y)$. Clearly, the sensitivity of the focus measure to depth (or defocus) is optimized by maximizing the coefficient $G_o(1/t_x, 1/t_y)$ with respect to the unknown parameters of the system. This optimization procedure can be summarized as:

$$\frac{\partial}{\partial t_x}G_0\left(\frac{1}{t_x},\frac{1}{t_y}\right) = 0, \quad \frac{\partial}{\partial t_y}G_0\left(\frac{1}{t_x},\frac{1}{t_y}\right) = 0, \quad (28)$$

$$\frac{\partial}{\partial b_x}G_0\left(\frac{1}{t_x},\frac{1}{t_y}\right) = 0, \quad \frac{\partial}{\partial b_y}G_0\left(\frac{1}{t_x},\frac{1}{t_y}\right) = 0, \quad (29)$$

$$\frac{\partial}{\partial q_x}G_0\left(\frac{1}{t_x},\frac{1}{t_y}\right) = 0, \quad \frac{\partial}{\partial q_y}G_0\left(\frac{1}{t_x},\frac{1}{t_y}\right) = 0, \quad (30)$$

Since $t_x$ and $t_y$ show up in all the components in (25), the first two partial derivatives (equation (28)) are difficult to evaluate. Fortunately, the derivatives in (29) and (30) are sufficient to obtain relations between the system parameters. The following result maximizes sensitivity and spatial resolution of the focus measure g(x,y):

$$b_x = \frac{1}{2}t_x, \quad b_y = \frac{1}{2}t_y \quad (31)$$

$$q_x = \frac{1}{2}t_x, \quad q_y = \frac{1}{2}t_y \quad (32)$$

Next, we examine the spatial robustness of g(x,y). Imagine the imaged surface to be planar and parallel to the image sensor. Then, we would like the image sampling to produce the same absolute value of g(x,y) at all discrete sampling points on the image. This entails relating the illumination and sensing parameters so as to facilitate careful sampling of the product of cosine functions in (27). Note that the $$g(x, y) = g_0 \cdot s_g = G_0 \left( \frac{1}{t_x}, \frac{1}{t_y} \right) \cdot \left\{ 4\cos 2\pi \frac{1}{t_x} x \cdot \cos 2\pi \frac{1}{t_y} y \right\}. \quad (33)$$

$$^2III\left( \frac{1}{p_s}(x - \varphi_x), \frac{1}{p_y}(y - \varphi_y) \right)$$

All samples of g(x,y) have the same absolute value when the two cosines in the above expression are sampled at their peak values. Such a sampling is possible when:

$$p_x = \frac{1}{2} t_x, \ p_y = \frac{1}{2} t_y \quad (34)$$

and $$\psi_x = 0, \psi_y = 0 \quad (35)$$

Alternatively, the cosines can be sampled with a period of π/2 and phase shift of π/4. This yields the second solution:

$$p_x = \frac{1}{4} t_x, \ p_y = \frac{1}{4} t_y, \quad (36)$$

$$\varphi_x = \pm \frac{1}{8} t_x, \ \varphi_y = \pm \frac{1}{8} t_y. \quad (37)$$

The above equations give two solutions, shown in FIGS. 4A and 4B both are checkerboard illumination patterns but differ in their fundamental frequencies, size of the illumination cell, and the phase shift with respect to the image sensor. Equations (31), (32), (34), (35) yield the grid pattern shown in FIG. 4A. In this case the grid image and detector are registered with zero phase shift, and the image of the illumination cell has the same size and shape as the sensor elements (pixels). The second solution, shown in FIG. 4B, is obtained using the sampling solutions (36) and (37), yielding a filter pattern with illumination cell image two times the size of the sensor element and phase shift of half the sensor element size.

Tuned Focus Operator

Figure 6B:
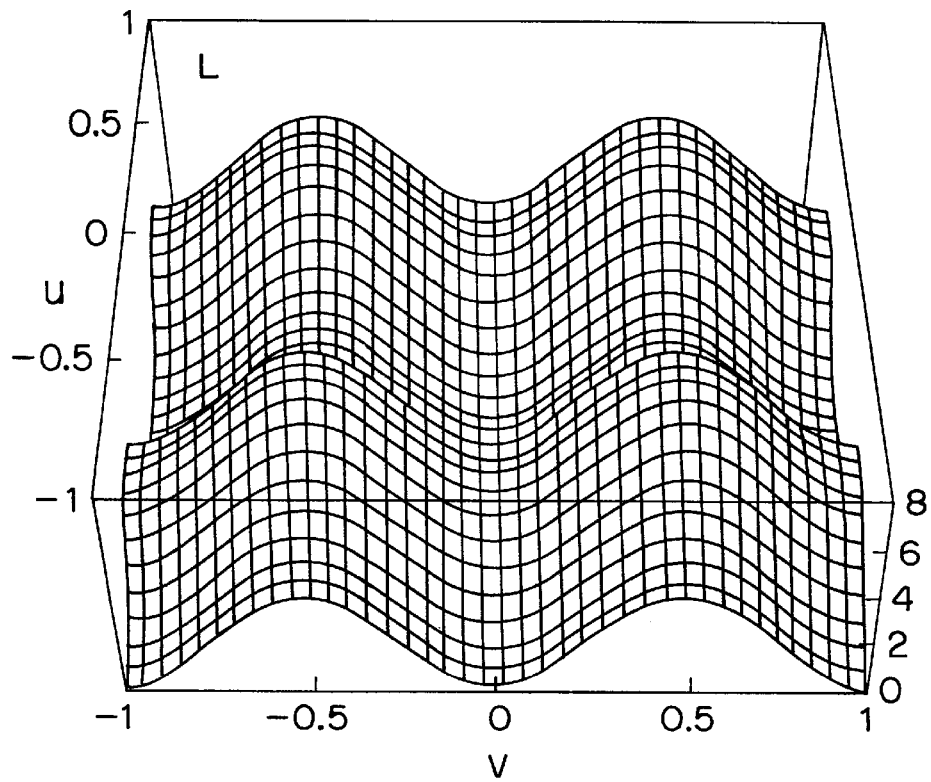
FIG. 6 are diagrams showing the determination of the tuned focus operator.

For the purpose of illumination optimization, we used the Laplacian operator. The resulting illumination pattern has only a single dominant absolute frequency, $(1/t_x, 1/t_y)$. Given this, we are in a position to further refine our focus operator so as to minimize the effects of all other frequencies caused either by the physical texture of the scene or image noise. To this end, let us consider the properties of the 3×3 discrete Laplacian (see FIGS. 6A and 6B). We see that though the Laplacian does have peaks exactly at $(1/t_x, 1/t_y), (1/t_x, -1/t_y), (-1/t_x, 1/t_y)$ and $(-1/t_x, -1/t_y)$, it has a fairly broad bandwidth allowing other spurious frequencies to contribute to the focus measure G in (23), as shown in FIG. 6B. Here, we seek a narrow band operator with sharp peaks at the above four coordinates in frequency space.

Given that the operator must eventually be discrete and of finite support, there is a limit to the extent to which it can be tuned. To constrain the problem, we impose the following conditions. (a) To maximize spatial resolution in computed depth we force the operator kernel to be 3×3. (b) Since the fundamental frequency of the illumination pattern has a symmetric quadruple arrangement, the focus operator must be rotationally symmetric. These two conditions force the operator to have the structure shown in FIG. 6C. (c) The operator must not respond to any DC component in image brightness. This last condition is satisfied if the sum of all elements of the operator equals zero:

$$a+4b+4c=0 \quad (38)$$

It is also imperative that the response L(u,v) of the operator to the fundamental frequency not be zero:

$$L\left( \frac{1}{t_x}, \frac{1}{t_y} \right) = a + 2b\left( \cos 2\pi q_x \frac{1}{t_x} + \cos 2\pi q_y \frac{1}{t_y} \right) + \quad (39)$$

$$4c \cos 2\pi q_x \frac{1}{t_x} \cos 2\pi q_y \frac{1}{t_y} \neq 0$$

Given (32), the above reduces to:

$$a - 4b + 4c \neq 0 \quad (40)$$

Expressions (38) and (40) imply that b≠0. Without loss of generality, we set b=−1. Hence, (38) gives a =4(1−c). Therefore, the tuned operator is determined by a single unknown parameter, c, as shown in FIG. 6D. The problem then is to find c such that the operator's Fourier transform has a sharp peak at $(1/t_x, 1/t_y)$. A rough measure of sharpness is given by the second-order moment of the power $\|L(u, v)^2\|$ with respect to $(1/t_x, 1/t_y)$:

$$M = \frac{1}{\left\| L\left( \frac{1}{t_x}, \frac{1}{t_y} \right) \right\|^2} \int_{u=0}^{\frac{2}{t_x}} \int_{v=0}^{\frac{2}{t_y}} \left[ \left( u - \frac{1}{t_x} \right)^2 + \left( v - \frac{1}{t_y} \right)^2 \right] \left\| L\left( u - \frac{1}{t_x}, v - \frac{1}{t_y} \right) \right\|^2 dv du \quad (41)$$

$$= \frac{t_x^2 + t_y^2}{768\pi^2 t_x^3 t_y^3} (20\pi^2 c^2 + 6c^2 + 48c - 32\pi^2 c + 20\pi^2 - 93)$$

Figure 6E:
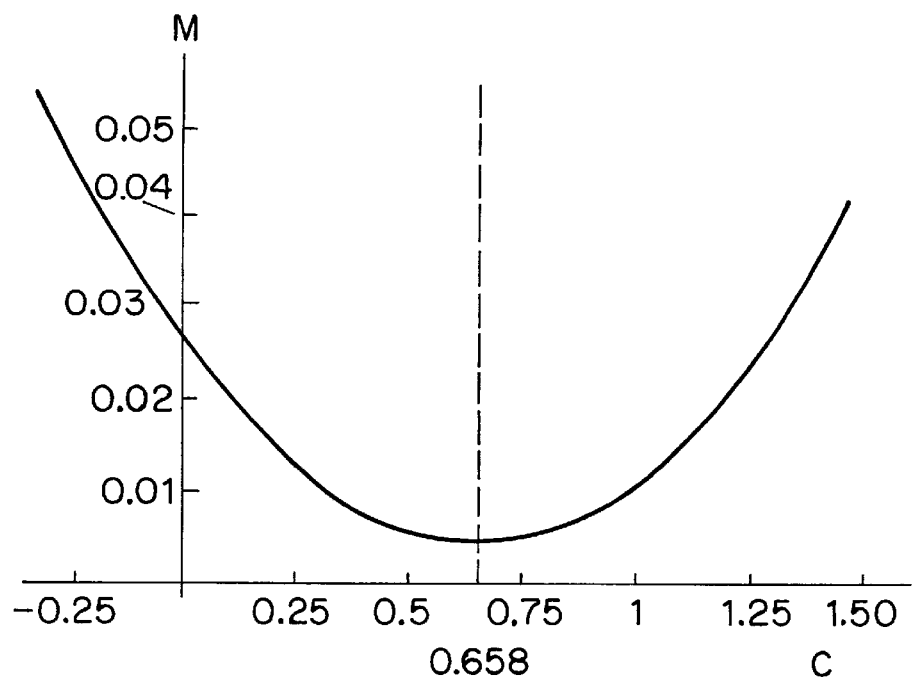
Figure 6F:
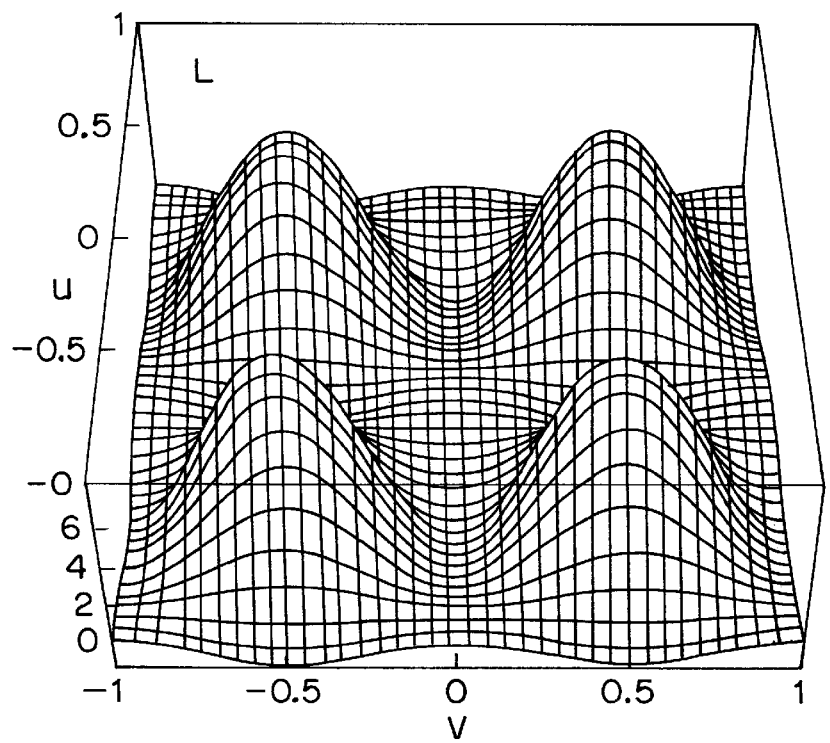

The above measure is minimized when $$\frac{\partial M}{\partial c} = 0,$$

i.e. when c=0.658 as shown in FIG. 6E. The resulting tuned focus operator has the response shown in FIG. 6F, it has substantially sharper peaks than the discrete Laplacian. Given that the operator is 3×3 and discrete, the sharpness of the peaks is limited. The above derivation brings to light the fundamental difference between designing tuned operators in continuous and discrete domains. In general, an operator that is deemed optimal in continuous domain is most likely sub-optimal for discrete images.

Depth from Two Images

Depth estimation uses two images of the scene $I_1(x, y)$ and $I_2(x, y)$ that correspond to different effective focal lengths as shown in FIG. 3. Depth of each scene point is determined by estimating the displacement α of the focused plane $I_f$ for the scene point. The tuned focus operator is applied to both images to get focus measure images $g_1(x, y)$ and $g_2(x,y)$. From (33) we see that:

$$\frac{g_1(x,y)}{g_2(x,y)} = \frac{G_0\left(\frac{1}{t_x}, \frac{1}{t_y}, \alpha\right)}{G_0\left(\frac{1}{t_x}, \frac{1}{t_y}, \alpha - \beta\right)} \quad (42)$$

From (23) we see that the only factor in $G_o$ affected by parameter $\alpha$ is defocus function H.

$$\frac{g_1(x,y)}{g_2(x,y)} = \frac{H\left(\frac{1}{t_x}, \frac{1}{t_y}; \alpha\right)}{H\left(\frac{1}{t_x}, \frac{1}{t_y}; \alpha - \beta\right)} \quad (43)$$

Note that the above measure is not bounded. This poses a problem from a computational viewpoint which is easily remedied by using the following normalization:

$$q(x,y) = \frac{g_1(x,y) - g_2(x,y)}{g_1(x,y) + g_2(x,y)} \quad (44)$$

$$= \frac{H\left(\frac{1}{t_x}, \frac{1}{t_y}; \alpha\right) - H\left(\frac{1}{t_x}, \frac{1}{t_y}; \alpha - \beta\right)}{H\left(\frac{1}{t_x}, \frac{1}{t_y}; \alpha\right) + H\left(\frac{1}{t_x}, \frac{1}{t_y}; \alpha - \beta\right)}$$

Figure 7:
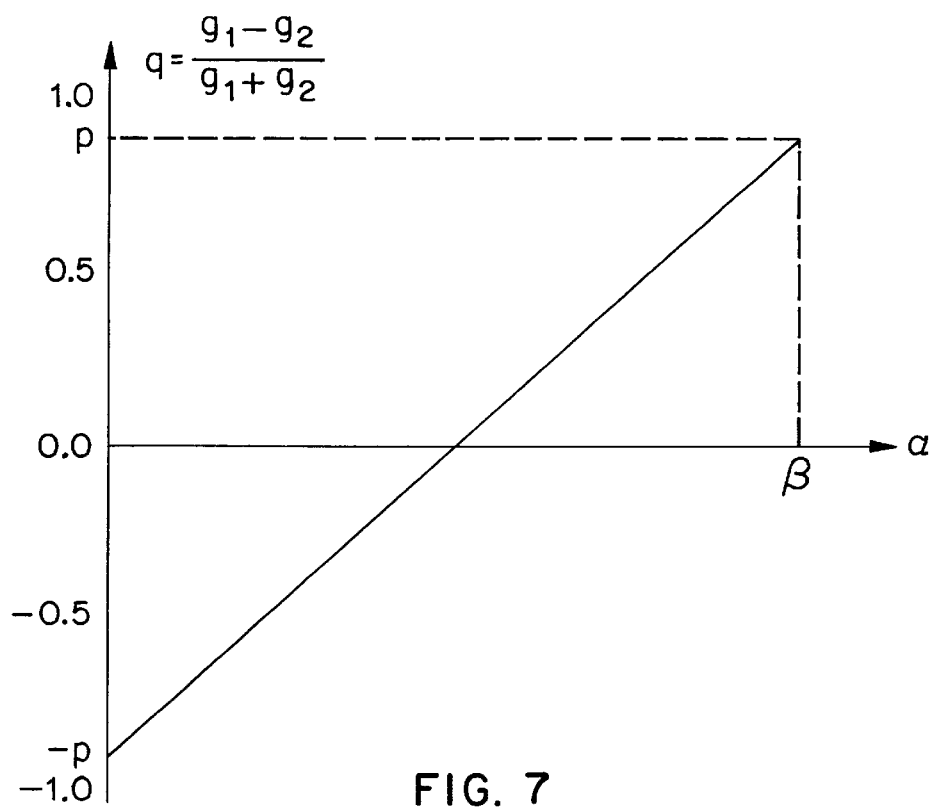
FIG. 7 is a graph of the normalized defocus factor as a function of distance between the image plane and the focused image plane.

As shown in FIG. 7, q is a monotonic function of a such that $-p \leq q \leq p$, $p \leq 1$. In practice, the above relation can be pre-computed and stored as a look-up table that maps q computed at each image point to a unique $\alpha$. Since $\alpha$ represents the position of the focused image, the lens law (1) yields the depth d of the corresponding scene point. Note that the tuned focus operator designed in the previous section is a linear filter. making it feasible to compute depth maps of scenes in real-time using simple image processing hardware.

Real Time Range Sensor

Based on the above results, we have implemented the real-time focus range sensor 25 shown in FIG. 2. The scene is imaged using a standard 12.5 mm Fujinon lens 28 with an additional aperture 26 added to convert it to telecentric. Light rays passing through the lens 28 are split in two directions, using a beam-splitting prism 30. This produces two images that are simultaneously detected using two Sony XC-77-RR 8-bit CCD cameras 32, 34. The positions of the two cameras are precisely fixed such that one obtains a near-focus image while the other a far-focus image. In this setup a physical displacement of 0.25 mm between the effective focal lengths of the two CCD cameras translates to a sensor depth of field of approximately 30 cms. This detectable range of the sensor can be varied either by changing the sensor displacement or the focal length of the imaging optics.

The illumination grid shown in FIG. 4B was etched on a glass plate using microlithography, a process widely used in VLSI. The grid 14 was then placed in the path of a 300 W Xenon arc lamp. The illumination pattern generated is projected using a telecentric lens 16 identical to the one used for image formation. A half-mirror 20 is used to ensure that the illumination pattern projects onto the scene via the same optical path 24 used to acquire images. As a result, the pattern is almost perfectly registered with respect to the pixels 36 of the two CCD cameras 32, 34. Furthermore, the above arrangement ensures that every scene point that is visible to the sensor is also illuminated by it, avoiding shadows and thus undetectable regions.

Images from the two CCD cameras 32, 34 are digitized and processed using MV200 Datacube image processing hardware. The present configuration includes the equivalent of two 8-bit digitizers, two A/D convertors, and one 12-bit convolver. This hardware enables simultaneous digitization of the two images, convolution of both images with the tuned focus operator, and the computation of a 256×240 depth map, all within a single frametime of 33 msec with a lag of 33 msec. A look-up table is used to map each pair of focus measures ($g_1$ and $g_2$) to a unique depth estimate d. Alternatively, a 512×480 depth map can be computed at the same rate if the two images are taken in succession. Simultaneous image acquisition is clearly advantageous since it makes the sensor less sensitive to variations in both illumination and scene structure between frames. With minor additions to the present processing hardware, it is easy to obtain 512×480 depth maps at 30 Hz using simultaneous image grabbing. Depth maps produced by the sensors 25 can be displayed as wireframes at frame rate on a DEC Alpha workstation.

Variation In The Preferred Embodiment

Figure 8:
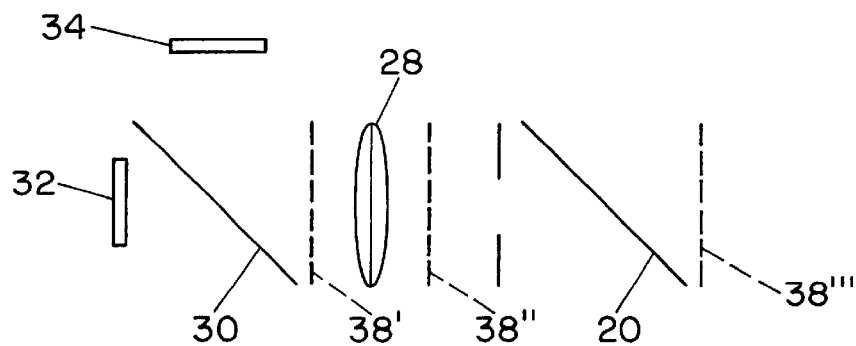
FIG. 8 is a drawing of the optics of the apparatus of FIG. 2 showing alternate filter locations.

One variation of the sensor 10 addresses the fact that the defocus effect is a function of the chromatic content of the illuminating light. Most lenses have slightly different focal length for-different light wavelengths, accordingly, the accuracy of determination of depth from defocus can vary with the spectral characteristics of the illumination and the color of the reflecting surface of the object, since depth determination relies on prior knowledge of the focal length f of lens 28. This source of error can be avoided by providing a spectral band-pass filter 38, shown in FIG. 2, to allow only certain elements of reflected light to be imaged. A band-pass filter would limit the range of the wavelengths to be imaged and thereby limit the chromatic variation in the focal length of the lens. Other possible locations for such a filter are shown in FIG. 8 at 38', 38" and 38'".

In the case where the illumination source 12 is a laser, the filter is preferably narrow band, passing the laser frequency and eliminating most ambient light, thereby both eliminating the effects of chromatic aberration of the lens and texture variations from ambient light, not resulting from the projected grid pattern.

Figure 9:
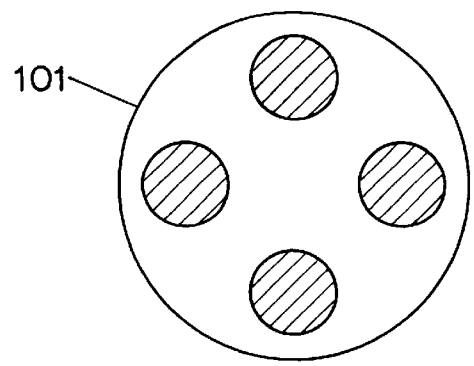
FIG. 9 is a plan view of a selectable filter.

In multicolor scenes with no-overlapping spectral characteristics, the pass-band of the spectral filter may be changed or controlled to use an appropriate pass-band to measure depth in different object areas. For this purpose an electrically controllable filter, or a filter wheel 101, shown in FIG. 9 may be used.

In some instances objects to be mapped may include surfaces or structures that provide specular reflections as well as diffuse reflections. Specular reflections can produce negative effects in a depth from defocus measurement system. First, specular reflections tend to saturate the image sensors 32, 34, whereby focus and defocus information is lost. Second, the depth from defocus values derived from specular reflections represent the depth of the reflected source, not the reflecting surface. Finally, if the normal at a specular surface point does not bisect the illumination direction and the optical axis 24, then the surface point will not produce reflections of the illumination light in the direction of the sensor.

Figure 10A:
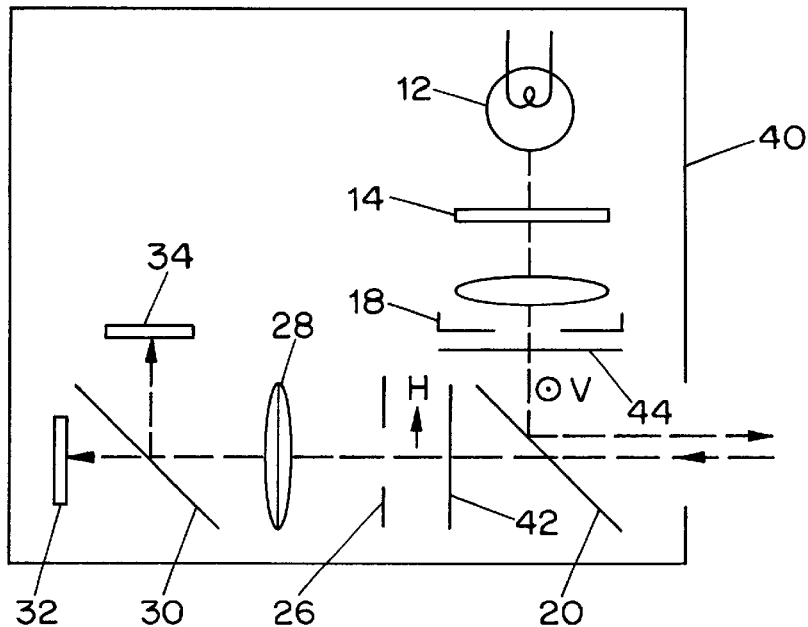
Figure 10B:
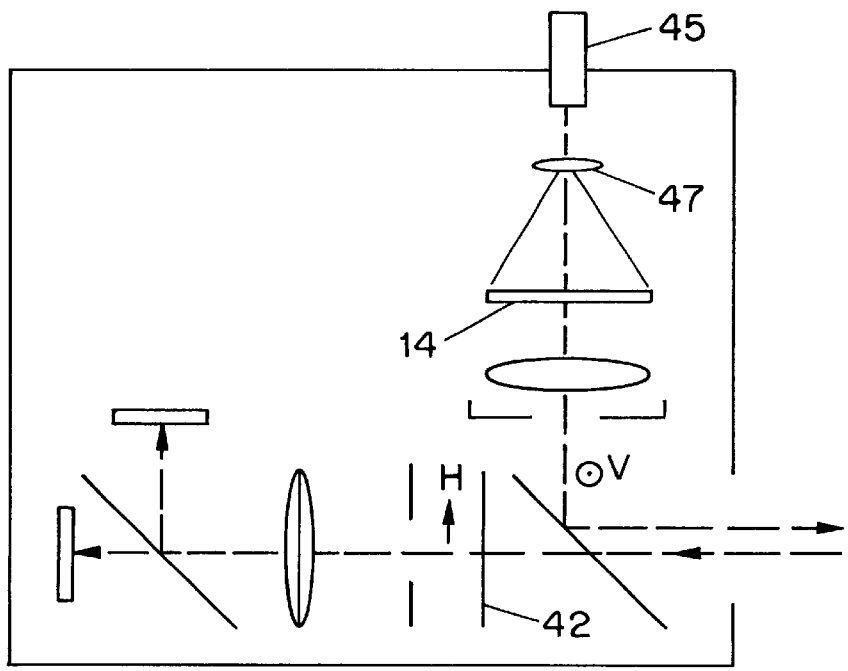
Figure 10C:
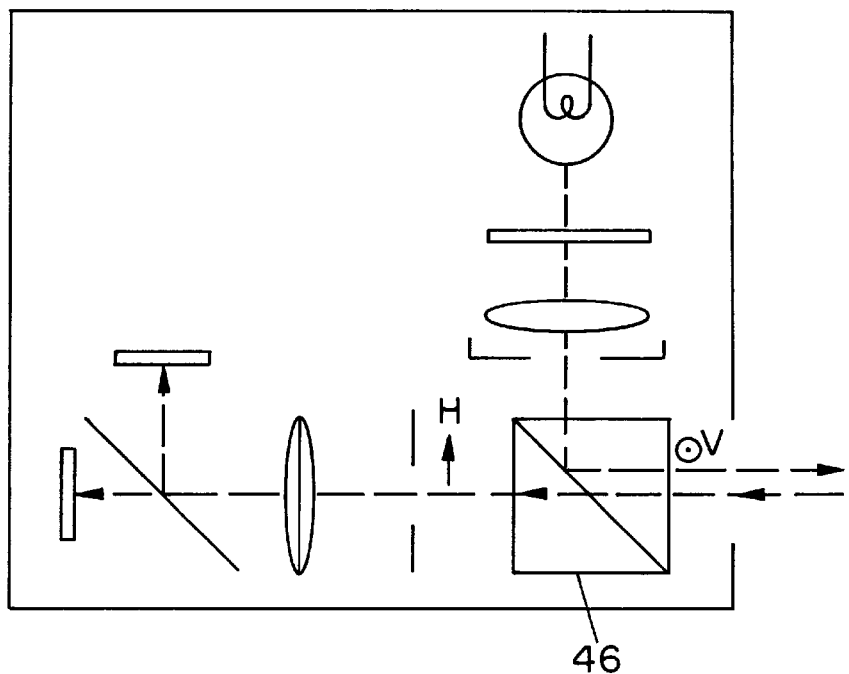

When required, polarization filters, as shown in FIGS. 10A to 10D can be used to remove the effects of specular reflection from the sensor images. In FIG. 10A a polarizing filter 44 polarizes the illumination light in a vertical direction indicated by arrowhead V. Specular reflections would therefore have primarily vertical polarization and would be filtered by horizontally polarized filter 42 arranged to provide horizontal polarization H in the sensor imaging system. An alternate, illustrated in FIG. 10B uses a vertically polarized laser source 45 which is projected onto grid 14 by lens 47 to provide vertically polarized illumination. A polarizing filter 42 protects the imaging optics from specular reflections. Another alternate shown in FIG. 10C uses the polarizing effect of a prism semi reflective beam splitter 46, which causes vertically polarized illumination V to be reflected toward the object, but allows horizontally polarized reflections H to pass to the imaging optics. A final arrangement of FIG. 4D shows a vertical polarizer 48 followed by a quarter wave plate 50 to produce circularly polarized light. Illumination light passing through polarizer 48 becomes vertically polarized and is converted to right-hand circular polarization by circular polarizer 50. Specular reflections, which have left-hand circular polarization are converted to horizontal polarization by polarizer 50 and are filtered out by vertical polarizer 48. Diffuse reflections include right-hand circular polarized components that are converted to vertical polarization by polarizer 50 and pass polarizer 48 to the sensor system.

Figure 11C:
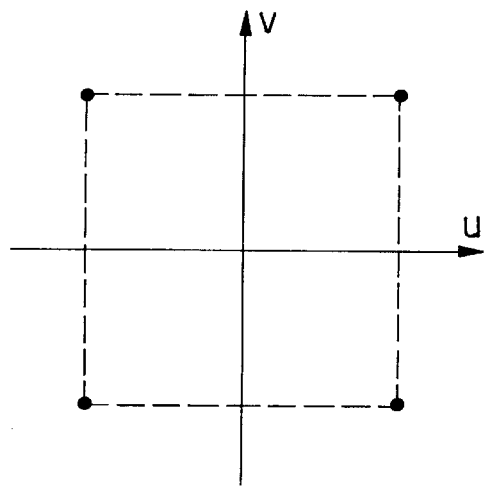
Figure 11D:
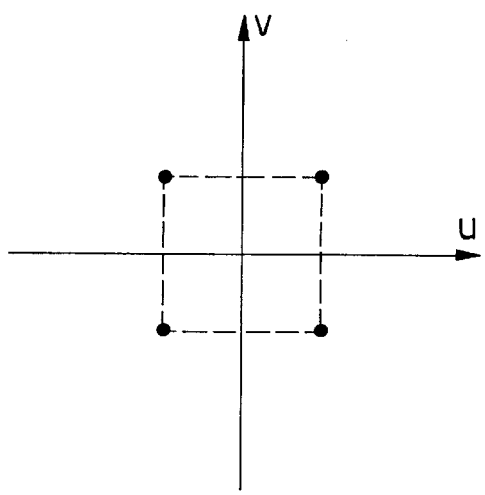
Figure 11E:
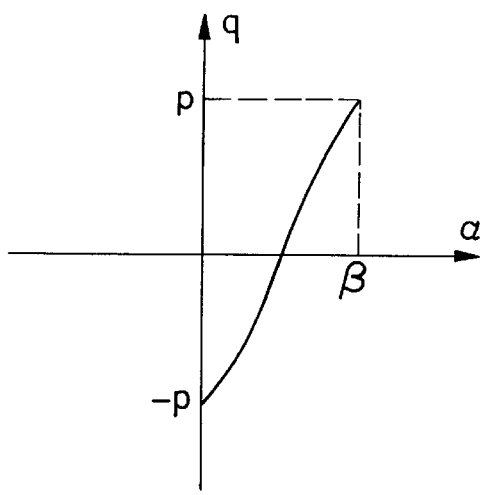
Figure 11F:
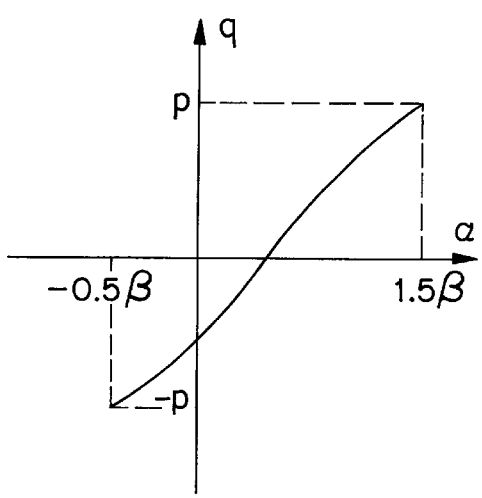

As described with respect to the preferred embodiment, the illumination patterns shown in FIGS. 4A and 4B include single fundamental spatial frequency in the x and y coordinates, with harmonic frequencies outside the limits imposed by the optical transfer function. It is, however, possible to use illumination grid patterns that have multiple measurable spatial frequencies within the limits of the optical transfer function. One such multiple frequency grid pattern is shown in FIG. 11A, wherein two checkerboard grids, one with twice the spatial frequency of the other are superimposed. The resulting sensing of the defocus function, FIG. 11B, can be filtered in the frequency domain by tuned filters to result in multiple tuned focus operators that detect power variations for different defocus frequencies on a pixel by pixel basis, as shown in FIGS. 11C and 11D. The defocus discrimination functions g for sensitivity of depth from defocus are shown in FIGS. 11E and 11F respectively. The high/frequency defocus function yields greater depth sensitivity, but reduced range. The lower frequency defocus function yields lower depth sensitivity, but increased range. Accordingly, using the multiple frequency grid of FIG. 11A can provide variable resolution depth from defocus.

Still other grid patterns are shown in FIGS. 12A and 12C with their respective frequency responses in FIGS. 12B and 12D respectively. The pattern of FIG. 12A has dual frequency response characteristics similar to the pattern of FIG. 11A, but using a different pattern arrangement. The grid of FIG. 12C has different frequency responses in the x and y coordinates.

Aperture Variation

The apparatus and method described thus far uses two sensor images taken at different distances from the imaging lens to generate different amounts of defocus in the images. It is also possible to provide images with different defocus by using different aperture sizes or shapes for the two images, which are formed on substantially the same image plane with respect to the imaging lens. It is well recognized, for example, that a small aperture opening a' will cause less defocus effect in an image than a large aperture opening.

One approach to aperture variation is to use the apparatus of FIG. 2, eliminating beam splitter 30 and sensor array 32. A first image of an object 22 is formed on sensor array 34 with a first setting of aperture 26 and a second image is sequentially formed using a different setting of aperture 26. Preferably a zero density filter is used with the larger aperture setting to compensate for the greater amount of light. The variation in the defocus factor between the two aperture settings can then be used to determine depth of an image element by defocus.

Figure 13:
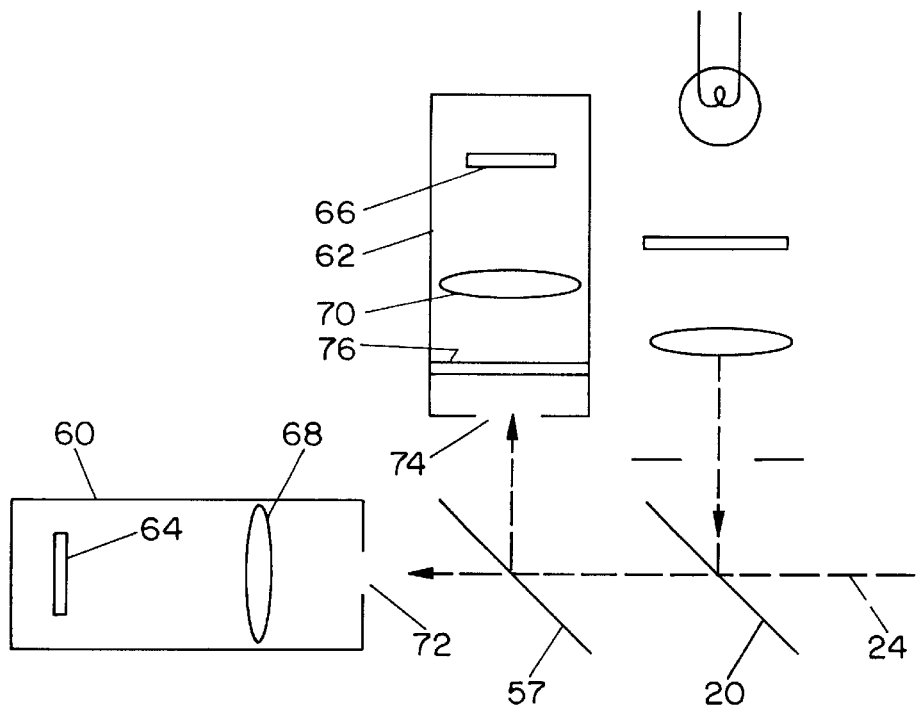
FIG. 13 is a simplified drawing of an apparatus for determining depth of imaged object elements using two different apertures.
Figure 14:
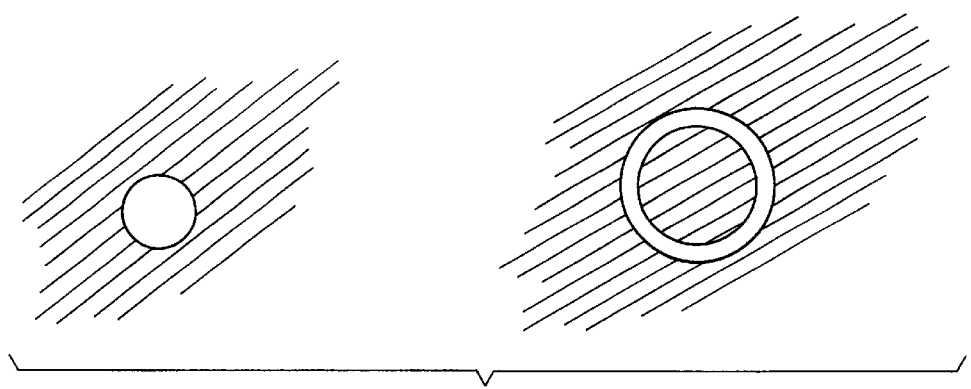
FIG. 14 is a plan view of a pair of constant area, variable geometry apertures.

Another approach, shown in FIG. 13 provides a beam splitter 57 which is external to a pair of sensor units 60, 62. Units 60, 62 have identical sensor arrays 64, 66 and lenses 68, 70. Unit 60 has a small aperture opening 72 while unit 62 has a large aperture opening 74 and a neutral density filter 76 to compensate for the increased light from the larger aperture. Alternately, in either a sequential or simultaneous aperture based arrangement, two apertures having similar transparent area size but different shape, such as apertures 110 and 112, shown in FIG. 14, can be used. The difference in aperture shape changes the optical transfer function, i.e., depth of focus, while maintaining the same image brightness.

Registration

Figure 15:
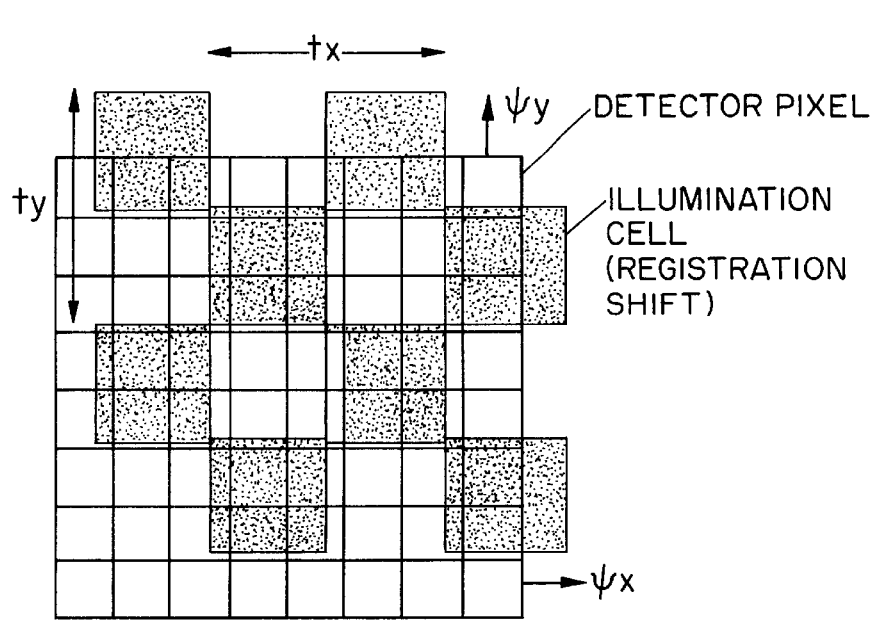
FIG. 15 shows a registration shift of the grid pattern with respect to a pixel array.
Figure 15:
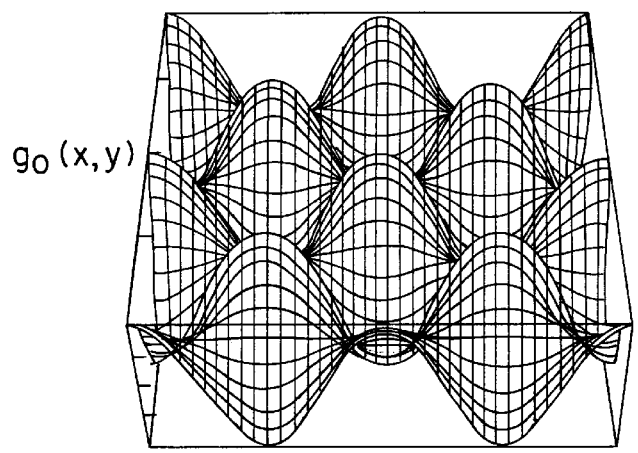

While those skilled in the art will recognize that calibration of the system 10 of FIG. 2 can be achieved by aligning the sensor arrays 32, 34 with the image grid as projected onto a plane surface located at the field focal plane of the sensor, it is also possible to compensate for mis-alignment in the computation of the defocus function. Misregistration of an illumination pattern of the type shown in FIG. 4B with respect to a sensor array is shown in FIG. 15, wherein the illumination pattern is mis-registered by an amount $\Delta\phi x$ and $\Delta\phi y$ from the normal phase offset value $\pm\frac{1}{8}st_x$ and $\pm\frac{1}{8}st_y$ given by equation (37). In this case the output of each sensor element in the misaligned sensor will have an error of $$\cos \Delta\phi x \cos \Delta\phi y$$

which will cause a depth map error.

It is possible to compensate for this alignment error by applying an additional operator to the convolved image, taking the sum of squared data of the convolved image at four adjacent elements which correspond to the phase shift of $(\phi_x, \phi_y)=(0, 0), (0, \pi/2), (\pi/2,0)$ and $(\pi/2, \pi/2)$. This results in a power measurement that can be directly applied to a power look up table for defocus, or can be modified by the square root function before being applied to the normalization or look-up table.

In the case of a one dimensional pattern (stripes) it is only necessary to apply the above procedure to two adjacent element points in the direction transverse to the pattern stripes.

It is also possible to numerically construct two tuned operators which produce focus measure data whose phases differ by $\pi/2$ (sine and cosine). In the case of the two dimensional pattern, it is likewise possible to numerically construct four tuned operators which produce focus measure data whose phases differ $(\phi_x, \phi_y)=(0, 0), (0, \pi/2), (\pi/2,0)$ and $(\pi/2, \pi/2)$. These convolved images can be combined to calculate the sum of squares at positions corresponding to the image elements to get a focus measure that is independent of alignment phase in either one or two dimensional grid patterns.

Concurrent Imaging

In some applications it is desirable to have both a depth map and a brightness image of a scene. In this respect the images used to compute depth from defocus can be used to computationally reconstruct a normal brightness image by removing the spatial frequencies associated with the projected illumination. This can be achieved using a simple convolution operation to yield an image under ambient illumination. Further, since the depth of each image point is known, a de-blurring operation, which can also be implemented as a convolution, can be applied to the brightness image that has the highest degree of focus at all points. In the case of coaxial illumination and imaging, the computed focused brightness image is registered with the computed depth map and may be stored in a suitable memory. This enables the use of, not only fast texture mapping, but also the joint recovery of geometric and photometric scene properties for visual processing, such as object recognition. Three-dimensional texture maps may be displayed as wireframes at frame rate on a bitmapped workstation.

Figure 16:
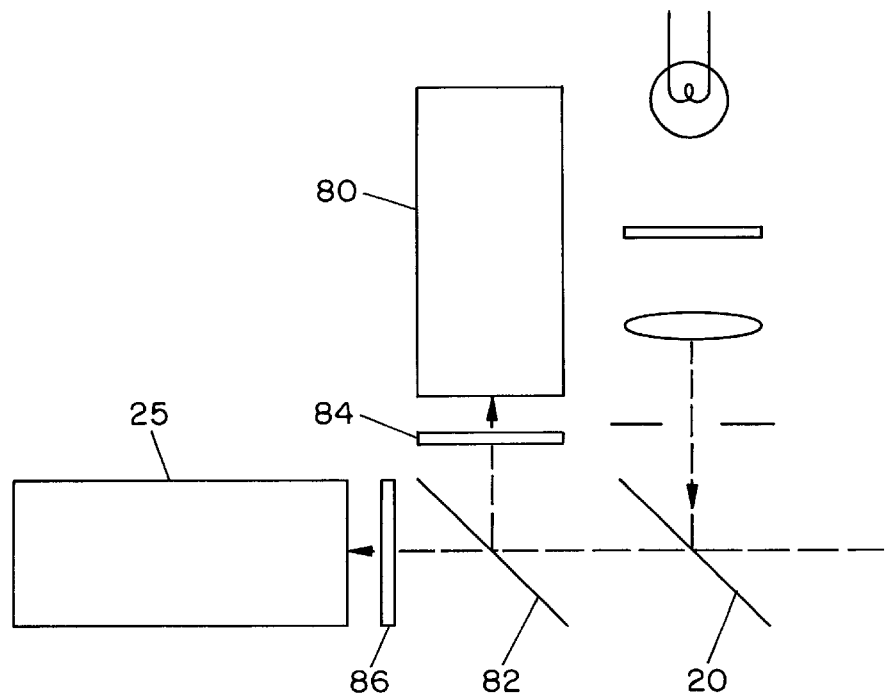
FIG. 16 is an apparatus for recovering depth information and images of an object.

FIG. 16 shows an arrangement for separate detection of brightness images in a television camera 80 and depth by sensor 25, which may be the embodiment of FIG. 2. In this arrangement various filter or sequencing techniques may be used to remove the effect of the illumination pattern in the brightness image. For example, beam splitter 82 may be formed as a selective reflector allowing frequencies corresponding to the illumination pattern to pass to depth sensor 25 and reflecting other light to camera 80. Alternatively, filter 84 can be arranged to selectively absorb the illumination frequency and pass other frequencies, while filter 86 passes the illumination frequency to depth sensor 25. Such filtering is especially practical in the case narrow band, e.g. laser, pattern illumination.

Figure 17A:
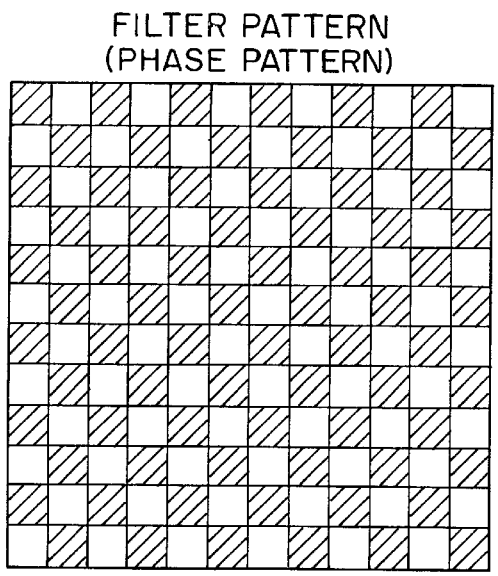
FIG. 17A through E illustrates a phase shift grid screen and the resulting illumination and spatial frequency response.
Figure 17A:
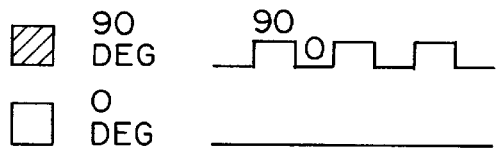
Figure 17B:
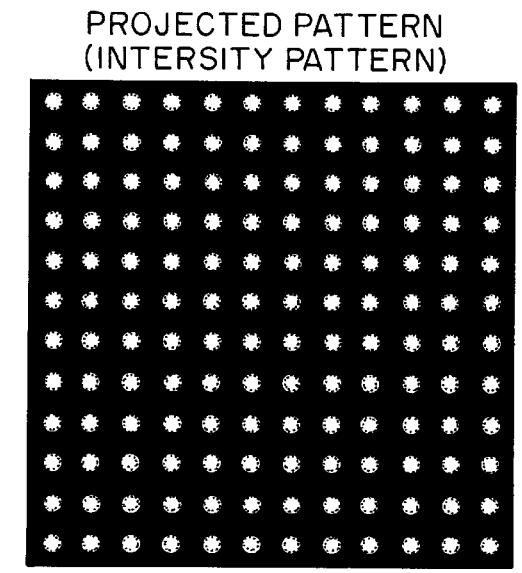
Figure 17C:
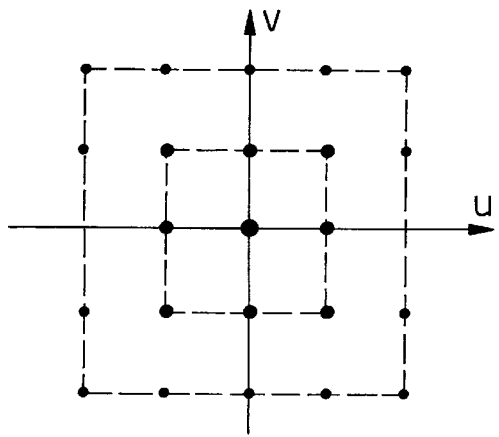
Figure 17D:
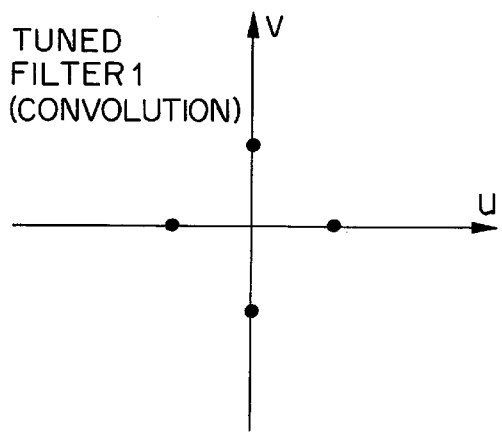
Figure 17E:
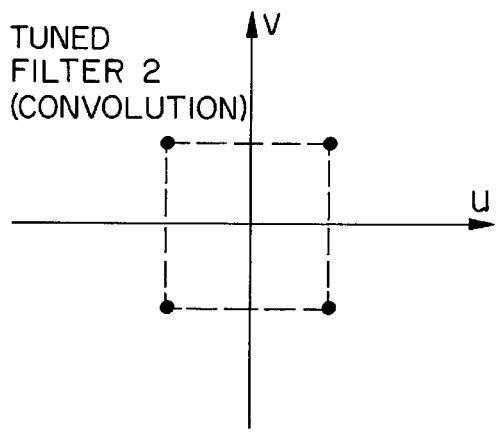

An alternate to using a transmission grid screen, as shown in FIGS. 4A and 4B is to use a phase pattern grid, wherein there is provided a checkerboard grid of rectangular elements, with transmission phase shifted by 90° in alternate grid elements as shown in FIG. 17A. This "phase grid" provides a projected pattern of alternating constructive and destructive interference as shown in FIG. 17B and results in a frequency domain pattern FIG. 17C, that can be analyzed by tuned filter convolution to provide alternate separate frequency responses for defocus analysis as shown in FIGS. 17D and 17E. The advantage of a phase shift grid is that there is little loss of energy from the grid illumination as compared to the transmission grid pattern.

In connection with the provision of an illuminated grid pattern, as noted above, a laser is the preferred source for several reasons, including (1) narrow band illumination, providing ease of filtering and absence of chromatic aberration in detected images, (2) better control of surfaces, including lens, filter and mirror coatings for single frequency light, (3) polarized light without loss of energy, and (4) bright, and controllable light source using low power.

Figure 18:
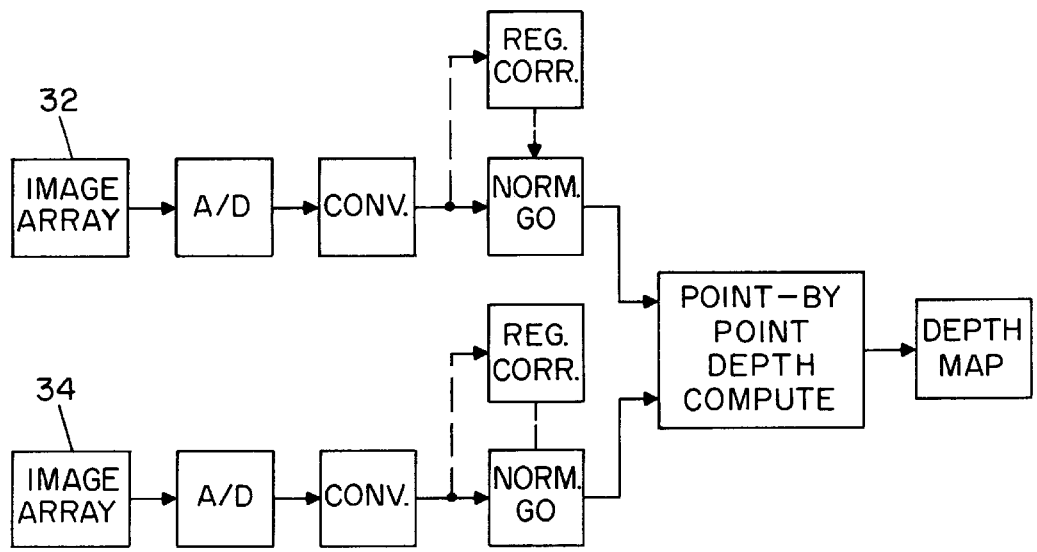
FIG. 18 is a computation-flow diagram showing the derivation of depth map information from two defocused images.

FIG. 18 is a flow diagram showing the determination of the image depth map from the image information received in sensor array; 32 and 34. The image sensor data is converted to digital format, and then convolved in accordance with the methods described herein, to result in a determination of the defocus measures for each element of each image. Optionally registration correction, as described above, can be performed in the process of arriving at defocus measures $g_o$ and $g_1$. The defocus measures are then combined in a point-by-point manner to determine the normalized relative blur of the two images and, using computation or a look-up table determine depth of the object on a point-by-point basis, resulting in the desired depth map.

Further, while some embodiments of the invention indicate simultaneous generation of images, depending on the dynamics of the application it should be recognized that the invention can be practiced with sequentially formed images, wherein the image spacing, lens position and/or aperture are varied between images, but the object position remains constant.

While we have described what we believe to be the preferred embodiments of the invention, those skilled in the art will recognize that other and further changes and modifications can be made thereto without departing from the spirit of the invention, and it is intended to claim all such changes as fall within the true scope of the invention.

What is claimed is:

1. A method for mapping a three-dimensional stricture by depth from defocus, comprising the steps of:

(a) illuminating said structure with a preselected illumination pattern;

(b) sensing at least a first image and a second image of said illuminated structure with different imaging parameters; and (c) determining a relative blur between at least one elemental portion of said first image and at least one elemental portion of said second image which correspond to the same portion of said three-dimensional structure to identify depth of corresponding elemental portions of said three-dimensional structure.

2. The method of claim 1 wherein said illumination comprises illumination with a two dimensional illumination pattern.

3. The method of claim 2 wherein said illumination is with a rectangular grid having selected horizontal and vertical grid spacing of rectangular transparent and opaque elements forming a checkerboard pattern.

4. The method of claim 3 wherein said sensing comprises sensing using an array of sensing elements having horizontal and vertical array spacings that are integral sub-multiples of said horizontal and vertical grid spacing in said sensed images.

5. The method of claim 1 wherein said first image and said second image are formed with a telecentric lens system.

6. A method for mapping a three-dimensional structure by depth from defocus, comprising the steps of:

(a) illuminating said structure with a preselected illumination pattern comprising a rectangular grid projected along an optical axis;

(b) sensing at least a first image and a second image of said illuminated structure from said optical axis using a constant magnification imaging system and at imaging planes with different locations with respect to a focal plane of said imaging system; and (c) determining a relative blur between at least one elemental portion of said first image and at least one elemental portion of said second image which correspond to the same portion of said three-dimensional structure to identify depth of corresponding elemental portions of said three dimensional structure.

7. The method of claim 6 wherein said images are sensed using first and second sensing arrays of sensing elements arranged in a rectangular pattern with selected element spacing in each direction of said array.

8. The method of claim 7 wherein said rectangular grid has a checkerboard pattern with selected grid periodicity.

9. The method of claim 8 wherein said grid periodicity is selected to provide a grid image on said sensing arrays wherein said grid periodicity is an integral multiple of said corresponding element spacing.

10. The method of claim 9, wherein said grid periodicity is selected to provide a grid image with a period substantially equal to twice said element spacing, and said grid image is aligned with said array in two orthogonal directions.

11. The method of claim 9, wherein said grid image periodicity is substantially equal to four times said pixel width and said grid image is shifted on said array by one eighth of said grid image periodicity.

12. The method of claim 6, wherein said light source is a monochromatic laser light source.

13. The method of claim 9, wherein said sensing step comprises sensing at least two depth images of said scene formed by said laser light and at least one brightness image of said scene formed by ambient light, and said determining step comprises measuring a relative blur between said sensed laser light images.

14. The method of claim 6, wherein said first image is sensed at a position corresponding to a near focused plane and said second image is sensed at a position corresponding to a far focused plane.

15. The method of claim 6, wherein said illumination grid is selected so as to produce an illumination pattern which generates multiple spatial frequencies.

16. The method of claim 6, wherein said illuminating step further comprises using half-mirror optics to reflect said illumination pattern prior to illuminating said scene, and said sensing step further comprises passing said scene images through said half-mirror optics prior to sensing said scene, such that said illumination pattern and said scene images pass along a common optical axis.

17. The method of claim 6, wherein said illuminating step further comprises using polarization optics to polarize said illumination pattern prior to illuminating said scene, and said sensing step further comprises passing said scene images through polarization optics prior to sensing said scene.

18. The method of claim 6, wherein said determining step further comprises:
   (i) converting said sensed images into digital signals on a pixel by pixel basis; and
   (ii) convolving said digital signals on a pixel by pixel basis to determine power measurement signals that correspond to the fundamental frequency of said illumination pattern at each of said pixels for each sensed scene image.

19. The method of claim 18, wherein said measuring step further comprises:
   (iii) correcting said power measurement signals for misregistration on a pixel by pixel basis, such that any errors introduced into said power measurement signals because of misalignment between said sensing pixels of said array and said illumination pattern is corrected.

20. The method of claim 19, wherein said correcting step comprises taking the sum of the squares of said measurement signal at four neighboring pixels.

21. The method of claim 18, wherein said measuring step further comprises:
   (iii) normalizing said power measurement signals on a pixel by pixel basis.

22. The method of claim 18, wherein said measuring step further comprises:
   (iii) comparing said power measurement signals for one of said sensed images, on a pixel by pixel basis, with determined power measurements for a second of said sensed images to determine said depth information at each of said pixels.

23. The method of claim 6, wherein said determination step comprises arranging said pixel by pixel depth information as a depth map.

24. The method of claim 23, further comprising the step of displaying said depth map as a wireframe image.

25. The method of claim 13, wherein said determination step comprises arranging said pixel by pixel depth information as a depth map, further comprising the step of constructing a texture mapped three-dimensional display from said sensed brightness image and said depth map.

26. Apparatus for measuring a three-dimensional structure of a scene by depth from defocus, comprising:
   (a) active illumination means for illuminating the scene with a preselected illumination pattern;
   (b) sensor means, optically coupled to said illuminating means, for sensing at least a first image and a second image of the scene with differing optical or imaging parameters;
   (c) depth measurement means, coupled to said sensor means, for measuring a relative blur between at least one elemental portion of said first image and at least one elemental portion of said second image which correspond to the same portion of said three-dimensional structure to identify depth of said three-dimensional structure; and
   (d) scene recovery means, coupled to said measurement means, for reconstructing said three-dimensional structure of said sensed scene from said measured relative blur of said sensed images.

27. The apparatus of claim 26, wherein said sensor means comprises a plurality of sensors, each sensor having X*Y pixels of predetermined width to form an X*Y sensing grid, said depth measurement means measuring said relative blur on a pixel by pixel basis over said X*Y pixel grid, such that depth information is obtained for each of said pixels within said X*Y grid.

28. The apparatus of claim 27, wherein said active illumination means comprises:
   (i) an illumination base;
   (i) a light source coupled to said illumination base; and
   (ii) a spectral filter having said preselected illuminating pattern coupled to said illumination base, such that light from said light source passes through said spectral filter to form said preselected illumination pattern.

29. The apparatus of claim 28, wherein said preselected illumination pattern of said spectral filter is optimized so that a small variation in the degree of defocus sensed by said sensor means results in a large variation in the relative blur measured by said depth measurement means.

30. The apparatus of claim 29, wherein said optimized illumination pattern is a rectangular grid pattern.

31. The apparatus of claim 30, wherein said optimized illumination pattern comprises a pattern having a period being substantially equal to twice said pixel width and a phase shift being substantially equal to zero with respect to said sensing grid, in two orthogonal directions.

32. The apparatus of claim 30, wherein said optimized illumination pattern comprises a pattern having a period being substantially equal to four times said pixel width and a phase shift being substantially equal to one eighth of said pixel width with respect to said sensing grid, in two orthogonal directions.

33. The apparatus of claim 28, wherein said light source is a Xenon lamp.

34. The apparatus of claim 28, wherein said light source is a monochromatic laser.

35. The apparatus of claim 34, wherein said sensor means further comprises:
   (i) a sensor base;
   (i) first and second depth sensors, coupled to said sensor base, for sensing depth images of said scene formed by said laser light, such that said depth measurement means measure a relative blur between said sensed laser light images; and
   (ii) at least one brightness sensor, coupled to said sensor base, for sensing an image of said scene formed by ambient light.

36. The apparatus of claim 26, wherein said sensor means comprises:
   (i) a sensor base;
   (ii) a lens, coupled to said sensor base and optically coupled to said illuminating means, for receiving scene images;
   (iii) a beamsplitter, coupled to said sensor base and optically coupled to said lens, for splitting said scene images into two split scene images; and
   (iv) first and second sensors, coupled to said sensor base, wherein said first sensor is optically coupled to said beamsplitter such that a first of said split scene images is incident on said first sensor and said second sensor is optically coupled to said beamsplitter such that a second of said split scene images is incident on said second sensor.

37. The apparatus of claim 36, wherein said sensor means further comprises:
   (v) an optical member having an aperture, coupled to said sensor base in a position between said lens and said beamsplitter, being optically coupled to both said lens and said beamsplitter such that images received by said lens are passed through said aperture and are directed toward said beamsplitter.

38. The apparatus of claim 36, wherein said first sensor is at a position corresponding to a near focused plane in said sensed scene, and said second sensor is at a position corresponding to a far focused plane in said sensed scene.

39. The apparatus of claim 38, wherein said spectral filter includes an illumination pattern capable of generating multiple spatial frequencies for each image sensed by said first and second sensors.

40. The apparatus of claim 26, further comprising:
   (e) a support member, coupled to said active illumination means and said sensor means; and
   (f) a half-mirror, coupled to said support member at an optical intersection of said active illumination means and said sensor means, such that said preselected illumination pattern is reflected by said half-mirror prior to illuminating said scene, and such that said scene images pass through said half-mirror prior to being sensed by said sensor means, whereby said illumination pattern and said scene images pass through coaxial optical paths.

41. The apparatus of claim 26, further comprising:
   (e) a support member, coupled to said active illumination means and said sensor means; and
   (f) a half-mirror, coupled to said support member at an optical intersection of said active illumination means and said sensor means, such that said preselected illumination pattern passes through said half-mirror prior to illuminating said scene, and such that said scene images are reflected by said half-mirror prior to being sensed by said sensor means, whereby said illumination pattern and said scene images pass through coaxial optical paths.

42. The apparatus of claim 26, further comprising:
   (e) a support member, coupled to said active illumination means and said sensor means; and
   (f) a polarization filter, coupled to said support member at an optical intersection of said active illumination means and said sensor means, such that said preselected illumination pattern is reflected by said polarization filter prior to illuminating said scene, and such that said scene images pass through said polarization filter prior to being sensed by said sensor means, whereby said illumination pattern incident on said scene and said sensed scene images are both polarized in controlled polarization directions.

43. The apparatus of claim 27, wherein said depth measurement means further comprises:
   (i) analog to digital converting means, coupled to said sensor means, for converting sensed images into digital signals on a pixel by pixel basis; and
   (ii) convolving means, coupled to said analog to digital converting means, for convolving said digital signals on a pixel by pixel basis to derive power measurement signals that correspond to the fundamental frequency of said illumination pattern at each of said pixels for each sensed scene image.

44. The apparatus of claim 43, wherein said depth measurement means further comprises:
   (iii) registration correction means, coupled to said convolving means, for correcting said power measurement signals for mis-registration on a pixel by pixel basis, such that any errors introduced into said power measurement signals because of misalignment between said sensing pixels of said grid and said illumination pattern is corrected.

45. The apparatus of claim 44, wherein said registration correction means further include arithmetic means for multiplying each of said power measurement signals, on a pixel by pixel basis, by the sum of the squares of said power measurement signal's four neighboring power measurement signals.

46. The apparatus of claim 43, wherein said depth measurement means further comprises:
   (iii) normalizing means, coupled to said convolving means, for normalizing said power measurement signals on a pixel by pixel basis.

47. The apparatus of claim 43, wherein said depth measurement means further comprises:
   (iii) comparator means, coupled to said convolving means, for comparing said power measurement signals for one of said sensed images, on a pixel by pixel basis, with determined power measurements for a second of said sensed images, to determine said depth information at each of said pixels.

48. The apparatus of claim 47, wherein said comparator means includes a look-up table.

49. The apparatus of claim 27, wherein said scene recovery means comprises depth map storage means, coupled to said depth measurement means, for storing derived pixel by pixel depth information for said scene as a depth map.

50. The apparatus of claim 49, further comprising:
   (e) display means, coupled to said scene recovery means, for displaying said depth map as a wireframe on a bitmapped workstation.

51. The apparatus of claim 35, wherein said scene recovery means comprises three-dimensional texturemap storage means, coupled to said depth measurement means and said brightness sensor, for storing derived pixel by pixel depth information and brightness information for said scene, further comprising:
   (e) display means, coupled to said scene recovery means, for displaying said three-dimensional texturemap as a wireframe on a bitmapped workstation.

* * * * *

UNITED STATES PATENT AND TRADEMARK OFFICE
CERTIFICATE OF CORRECTION

PATENT NO.  : 6,229,913 B1
DATED       : May 8, 2001
INVENTOR(S) : Nayar et al.

It is certified that error appears in the above-identified patent and that said Letters Patent is hereby corrected as shown below:

Title page,
Item [54], Title: "TWO-IMAGES" should read -- TWO IMAGES --

Item [57], ABSTRACT,
Line 6, "defocused" should read -- defocus --

Drawings,
Figure 17B, "INTERSITY" should read -- INTENSITY --

Column 1,
Line 5, "TWO-IMAGES" should read -- TWO IMAGES --

Column 7,
Line 3, "of-the" should read -- of the --

Column 8,
Line 44, in the equation, "a" should read -- a' --

Column 9,
Line 2, "gric" should read -- grid --

Column 10,
Line 60, "are-bound" should read -- are bound --

Column 11,
Lines 27 and 35, "$(\Psi_x, \Psi_y)$" should read -- $(\varphi_x, \varphi_y)$ --
Equation (16), "$l_d$" should read -- $M_d$ --
Equation (17), "x,y)" should read -- (x,y) --

Column 12,
Line 35, "to-produce" should read -- to produce --
Equations (20 and 21), "$(\Psi_x, \Psi_y)$" should read -- $(\varphi_x, \varphi_y)$ --
Equations (21 and 22), "x,y)" should read -- (x,y) --

Column 13,
Line 7, "$(\Psi_x, \Psi_y)$" should read -- $(\varphi_x, \varphi_y)$ --
Line 43, "$(1/t_y$" should read -- $(1/t_y)$ --
Line 51, "is" (first occurrence) should be deleted

UNITED STATES PATENT AND TRADEMARK OFFICE
CERTIFICATE OF CORRECTION

PATENT NO. : 6,229,913 B1
DATED : May 8, 2001
INVENTOR(S) : Nayar et al.

It is certified that error appears in the above-identified patent and that said Letters Patent is hereby corrected as shown below:

Column 15,
Equation (34), "$\frac{1}{2}y_y$" should read -- $\frac{1}{2}t_y$ --

Equation (35), "$\Psi_x=0, \Psi_y=0$" should read -- $\varphi_x=0, \varphi_y=0$ --

Column 16,
Equation (39), "$\frac{1}{t_x}\cos$" should read -- $\frac{1}{t_x}+\cos$ --

Line 25, "a =4(1-c)." should read -- a=4(1-c). --

Column 18,
Line 4, "convertors," should read -- converters, --
Line 25, "for-different" should read -- for different --

Column 22,
Line 12, "two dimensional" should read -- two-dimensional --
Line 39, "three dimensional" should read -- three-dimensional --
Lines 54-55, "said grid image periodicity" should read -- said grid periodicity --
Line 57, "said grid image periodicity" should read -- said grid periodicity --

Column 23,
Line 33, "is" should read -- are --

Column 26,
Line 19, "is" should read -- are --

Signed and Sealed this

Thirtieth Day of April, 2002

*Attest:*

*Attesting Officer*

JAMES E. ROGAN
*Director of the United States Patent and Trademark Office*